United States Patent
Mantik et al.

(10) Patent No.: US 11,615,229 B1
(45) Date of Patent: Mar. 28, 2023

(54) PATTERN-BASED FORMAL DESCRIPTION LANGUAGE FOR DESCRIBING A POWER/GROUND ROUTING STRUCTURE IN AN INTEGRATED CIRCUIT DESIGN

(71) Applicant: Cadence Design Systems, Inc., San Jose, CA (US)

(72) Inventors: Stefanus Mantik, San Jose, CA (US); Jianmin Li, Los Gatos, CA (US); Dennis Jenhsin Huang, Palo Alto, CA (US); Dewi Farrah Santoso, San Jose, CA (US); Ting Li, Shanghai (CN); Ming Zhang, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/184,597

(22) Filed: Feb. 25, 2021

(51) Int. Cl.
   *G06F 30/3947* (2020.01)
   *G06F 30/398* (2020.01)
   *G06F 119/06* (2020.01)

(52) U.S. Cl.
   CPC ........ *G06F 30/3947* (2020.01); *G06F 30/398* (2020.01); *G06F 2119/06* (2020.01)

(58) Field of Classification Search
   CPC . G06F 30/3947; G06F 30/398; G06F 2119/06
   USPC .......................................................... 716/110
   See application file for complete search history.

(56) References Cited

U.S. PATENT DOCUMENTS 5,485,346 A * 1/1996 Kanbara ............... H01G 9/022
                                                       361/504
2001/0049813 A1 * 12/2001 Chan ................... H01L 23/5286
                                                       716/120
2006/0022678 A1 * 2/2006 Hegazy ............. G01R 31/2853
                                                       324/525
2006/0031795 A1 * 2/2006 Rahmat ................. G06F 30/398
                                                       716/111
2006/0095872 A1 * 5/2006 McElvain ............. G06F 30/394
                                                       716/113

(Continued)

OTHER PUBLICATIONS

Noda, T., "Proposal of Circuit Description Language," Central Research Institute of Electric Power Industry, JPST '99, dated Jun. 1999.

(Continued)

*Primary Examiner* — Suchin Parihar
(74) *Attorney, Agent, or Firm* — Vista IP Law Group, LLP

(57) ABSTRACT

An approach includes a new power and ground structure description language (PSDL) will allow the user to describe the desired routing pattern for each layer and on a user defined region by region basis, including how the pattern will be laid out in the design with respect to other patterns from a different layer. The new PSDL also gives the complete picture of the entire power and ground structure, instead of just a layer-by-layer view from a single command. It also allowed flexibility in alignment especially when dealing with track misalignments, thus avoiding the extensive trial-and-error steps needed to calculate offsets and distances to maintain pattern alignment using previous approaches. Additionally, because PSDL is not tightly dependent on the design size and/or floorplan, transferring the desired power and ground structure from one design to another will be very easy with only few adjustments.

20 Claims, 25 Drawing Sheets

(56) References Cited

U.S. PATENT DOCUMENTS

2017/0017746 A1    1/2017  Jiang et al.

OTHER PUBLICATIONS

Lin, R., et al., "Opportunities and Challenges for Circuit Board Level Hardware Description Languages," University of California, Berkeley, dated Nov. 2020.
Noda, T., "Electrical Circuit Description in the Form of Computer Language," Electrical Engineering in Japan, vol. 133, No. 4, dated 2000.
Lin, R., et al., "Polymorphic Blocks: Unifying High-level Specification and Low-level Control for Circuit Board Design," UIST '20, Oct. 20-23, 2020, Virtual Event, USA.

* cited by examiner

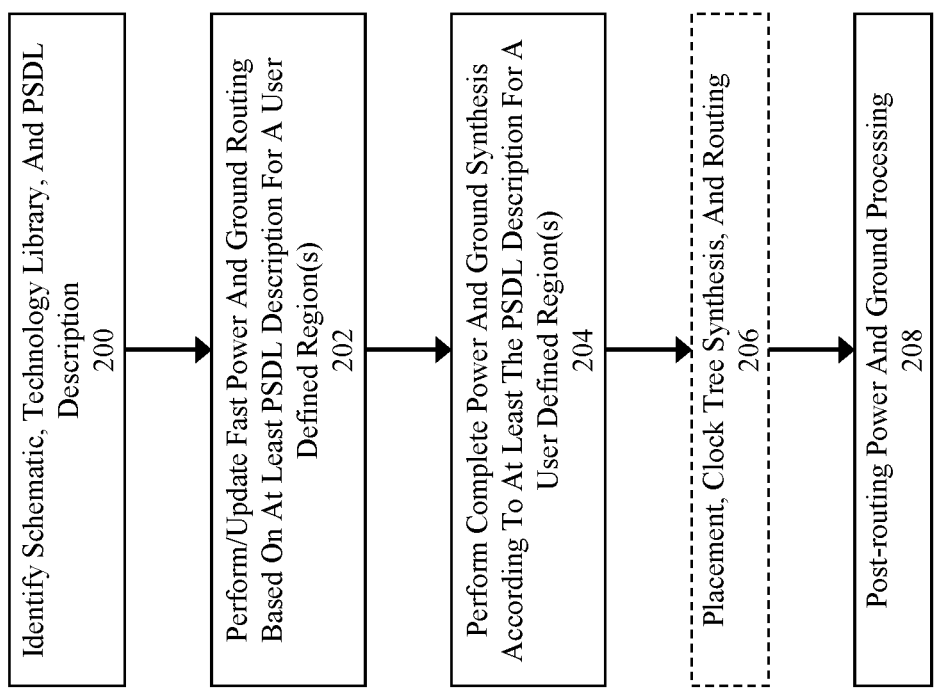

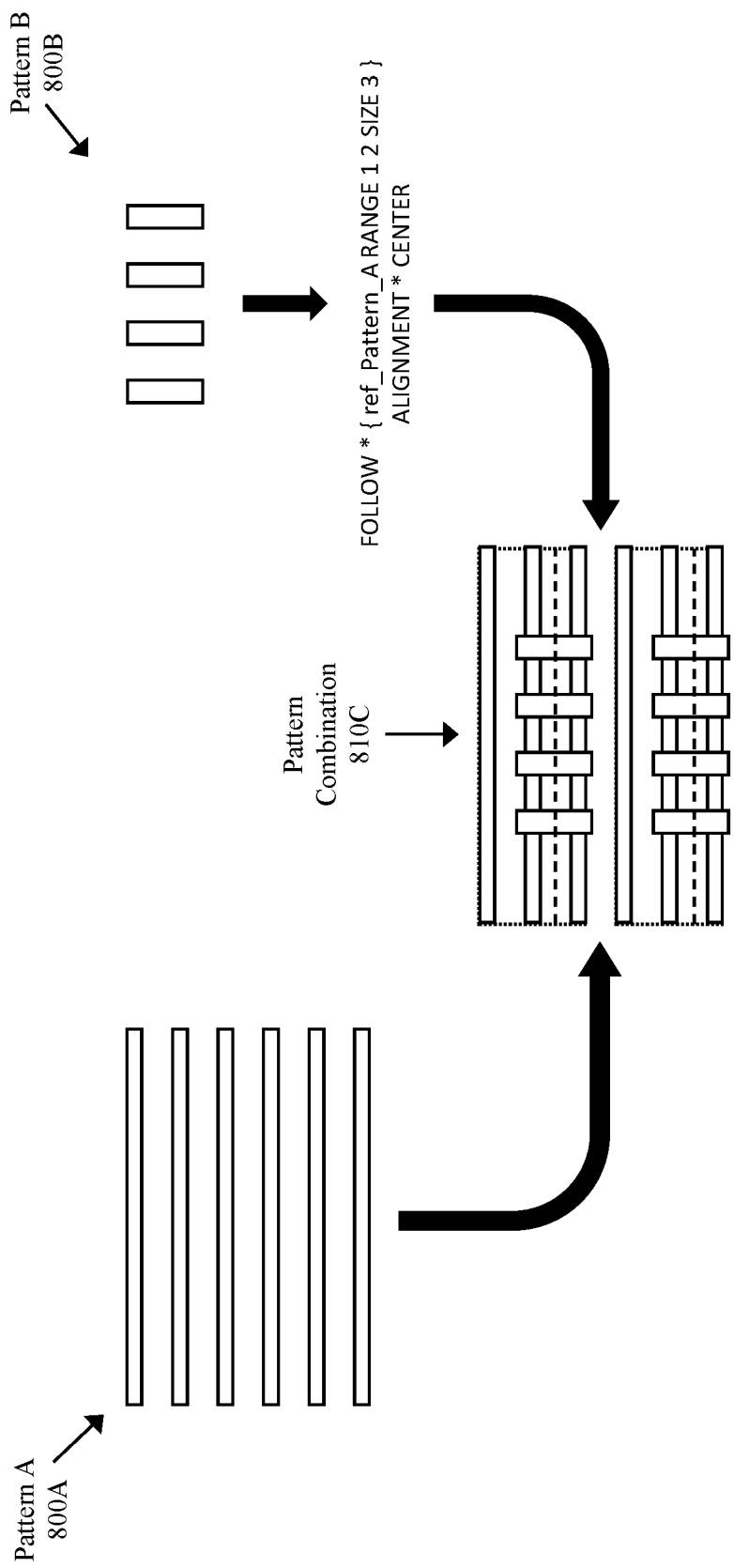

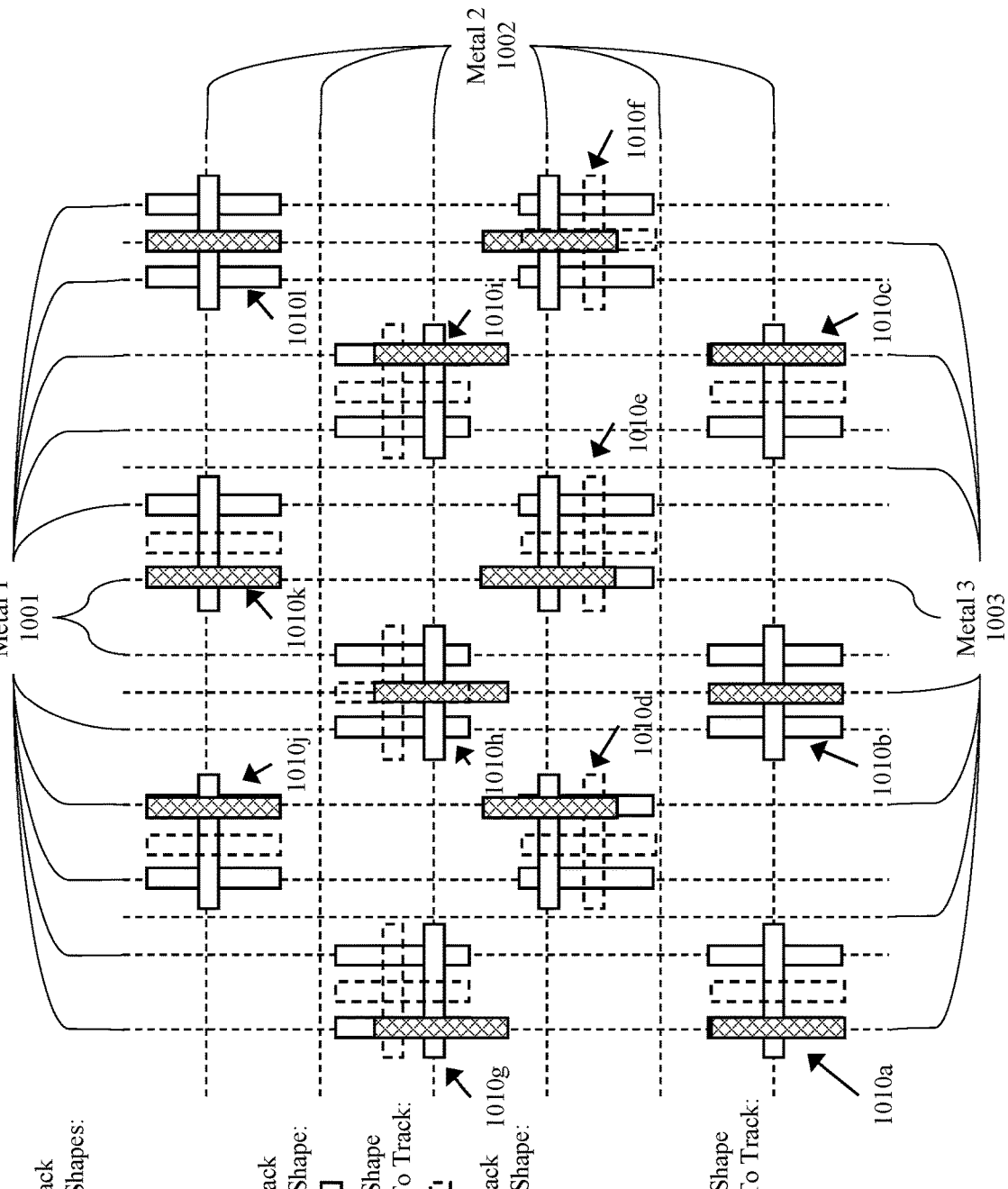

PATTERN-BASED FORMAL DESCRIPTION LANGUAGE FOR DESCRIBING A POWER/GROUND ROUTING STRUCTURE IN AN INTEGRATED CIRCUIT DESIGN

FIELD

The present invention is directed to approaches for designing power and ground networks for integrated circuits.

BACKGROUND

Power and Ground structures in integrated circuits distribute various voltages (e.g., power and ground) across the integrated circuits from the integrated circuit pads to the devices (e.g., transistors) that require those potentials to operate. Unfortunately, as the number of devices within each integrated circuit increases, so does the complexity of generating the necessary power and ground structures. This difficulty also increases with the number of layers within integrated circuits as this increases the complexity of such structures as the overall network will generally require more vias to connect the layers.

Currently, power and ground network generation is largely a manual process. An engineer specifies the structures in each layer, and those layers are generated in a layer-by-layer process, wherein often multiple iterations are required merely to align the different layers such that vias can be used to connect those layers in an acceptable manner. This is normally accomplished by adjusting offsets for shapes in respective layers such that there is sufficient aligned overlap between adjacent layers. Once the alignment between layers is completed, a via stack can be generated.

To accomplish the above approach, at least one TCL command is executed on a layer-by-layer basis to generate the power and ground structures. Alignments for metals on different layers can be achieved by adjusting the offset and distance values specified for each command. Unfortunately, the alignment issues are largely inherent in these designs due to track misalignment between layers where different layers have different width and spacing requirements.

Additionally, due to the sequential nature of command line executions, the quality of the generated power and ground mesh as well as the runtime needed for the generation are depended heavily on the order of the generation of layers in the script. This is at least due to the power and ground routing tools reliance on the user's ability and knowledge to execute the power and ground generation commands in the right and/or optimal layer order.

Finally, it is exceedingly difficult to transfer the power and ground structure from one design to another when relying only on the given scripts. This is because the scripts are generated for a specific design on a specific technology node.

Thus, what is needed is an improved method, product, and system that avoids the issues associated with current techniques.

SUMMARY

Embodiments of the present invention provide an approach for a method, product, and system for a novel pattern-based formal description language for describing a power/ground routing structure in an integrated circuit design.

Disclosed herein is a new approach to power and ground network generation using a power and ground structure description language (PSDL) which allows a user to describe desired routing patterns for each layer and how the pattern will be laid out in the design with respect to other patterns from a different layer. The PSDL enables a new flow that allows for early optimization of power and ground structures. This PSDL also gives the complete picture of the entire power and ground structure, instead of just a layer-by-layer view from a single command. It also allowed flexibility in alignment especially when dealing with track misalignments, thus avoiding the extensive trial-and-error steps needed in order to calculate offsets and distances to maintain pattern alignment using previous approaches. Additionally, because PSDL is not tightly dependent on the design size and/or floorplan, transferring the desired power and ground structure from one design to another with only few adjustments.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIG. 2 illustrates a flow for power and ground network generation according to some embodiments.

FIGS. 8A-8D illustrate example follow arrangements between patterns having different orientations according to some embodiments.

FIG. 10 illustrates an example embodiment where shapes are snapped to tracks according to some embodiments.

DETAILED DESCRIPTION

Figure 1:
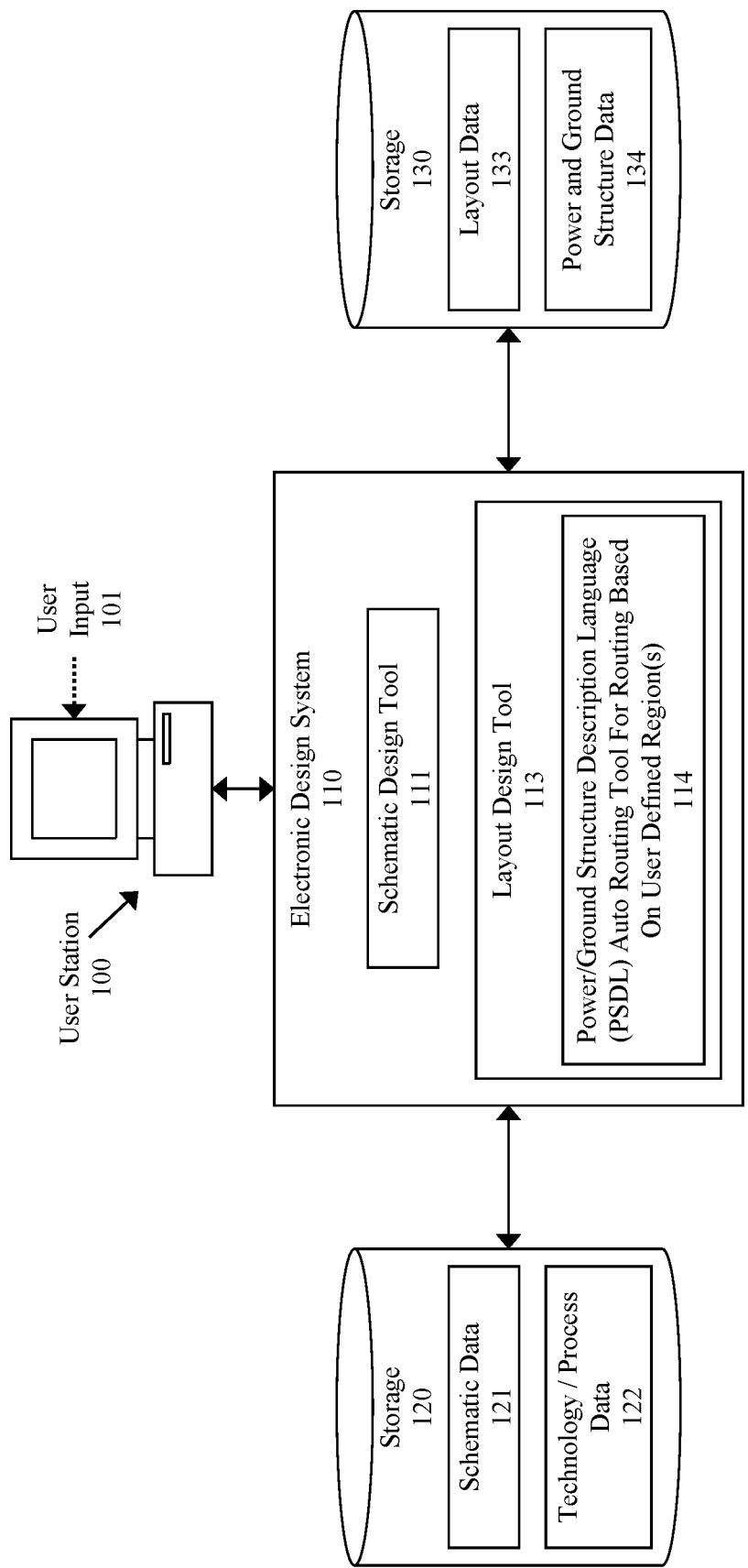
FIG. 1 illustrates an example arrangement for the power and ground network generation according to some embodiments.

Embodiments of the present invention provide an approach for a method, product, and system for a novel pattern-based formal description language for describing a power/ground routing structure in an integrated circuit design.

Various embodiments are described hereinafter with reference to the figures. It should be noted that the figures are not necessarily drawn to scale. It should also be noted that the figures are only intended to facilitate the description of the embodiments and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated.

A power and ground network is typically constructed as a mesh structure where horizontal and vertical stripes are placed on top of each other to generate a global power and ground mesh. In addition, short metal staples along with via stacking are used to create connections from the global power and ground mesh (typically at a higher metal layer) to the power and ground rail at progressively lower or the lowest metal layer.

The power and ground structure description language (PSDL) disclosed herein allows a user to describe desired routing patterns and instantiate those patterns on respective layers. Thus, PSDL language enables an engineer to see the complete picture of the power and ground structure because the language is structured to reflect the intent of the user. It also allows flexibility in creating alignment, especially when used with tracks. Additionally, PSDL is not tightly dependent on the design size and/or floorplan which makes transferring the desired power and ground structure from one design to another less burdensome.

In some embodiments, a graphical user interface (GUI) based front-end provides a graphical user interface for constructing and previewing power and ground structures. The GUI provides a graphical view of existing/described power and ground structures without the need to build the complete power and ground mesh in a design. The GUI front-end enables the user to visualize the outcome of a power and ground structure and interactively modify the power and ground structure as needed with any changes being reflected immediately in a view window (e.g., in an interactive GUI). Furthermore, PSDL can be used to allow power and ground mesh optimization, by providing a simpler way to modify the power and ground structure compared to the command line alternative as in the TCL (tool command language) approach. Generally, PSDL is used as the intermediary between the power and ground optimization engine and the power and ground mesh generation tools. The PSDL language provides for the instantiation of both one or more routing patterns for each metal layer as well as their locations and alignment (with respect to other patterns on different layer) for each instantiated pattern in a design.

Furthermore, PSDL can also be used to quickly generate a basic power and ground structure that is useful in floor planning stage, as well as mixed placement integration. Associated with the PSDL is a new power and ground construction flow that allows fast but rough creation of power and ground network. This enables fast generation of a power and ground mesh (e.g., with little or no error correction performed) for rapid prototyping, which is beneficial for area and resource estimation during floor planning stage, as well as during mixed placement integration. For example, during fast generation of a power and ground mesh any one or more of the follow DRC operations may be skipped to decrease the amount of processing required for the fast generation process: error correction to fix one or more of trimming/fixing metal alignment, fixing or optimization vias, fixing pad connections, fixing stripe to ring connections, fixing any rings, fixing staples, fixings strikes.

In some embodiments, the new flow includes a power and ground optimization loop where the power and ground structure can be optimized (e.g., for IR-drop reduction) by modifying some parameters in the PSDL or a database representation thereof. A machine learning engine can be used to optimize the power and ground structure by adjusting one or more parameters, where the power and ground generation tools will regenerate the power and ground structure based on the updated PSDL information.

In some embodiments, PSDL provides a complete picture of the intended power and ground structure or portion thereof. This allows the power and ground routing tools to evaluate the entire power and ground structure and determine the most optimal power and ground generation sequence that will produce the best quality as well as shortest runtime.

In some embodiments, PSDL allows users to describe the desired pattern(s) to be instantiated for each metal layer and the arrangement between different instantiated patterns on different layers. Thus, alignment can be achieved with only minimal effort without the need to manually recalculate offsets for each layer.

In some embodiments, PSDL allows users to specify technology independent keywords for its pattern description such as metal width and spacing. This enables an easy transfer of power and ground structure data from one design to another, even when they do not share the same technology node.

Finally, PSDL is easier to read and understand by users compared to the more complicated scripts (TCL scripts).

PSDL Flow

FIG. 1 illustrates an example arrangement for the power and ground network generation according to some embodiments. Generally, the process includes generation of a power and ground network using an auto routing tool that may be integrated within a layout design tool as illustrated herein.

As illustrated, FIG. 1 includes a user station 100, storage 120 and 130, and electronic design system 110.

In some embodiments, the user station 100 includes or provides access to the electronic design system 110 and controls the generation of a power and ground network according to a description provided in the power/ground description language (PSDL). For instance, the electronic design system 110 might be located on the user station 100, on a remote device accessed by the user station, or distributed across multiple devices. The user station 100 causes the execution of a process to generate a power and ground network. The user station 100 comprises any type of computing station that is useable to operate or interface with a database (e.g., 120 and/or 130). Examples of such user stations include workstations, personal computers, or remote computing terminals. In some embodiments, the user station 100 comprises a display device, such as a display monitor, for displaying a user interface to any users at the user station. The user station 100 also comprises one or more input devices for the user to provide operational control over the user station, such as a mouse or keyboard to manipulate a pointing object in a graphical user interface from which a user input 101 might be received.

The electronic design system 110, as illustrated, includes a schematic design tool 111 and a layout design tool 113. In some embodiments, the layout design tool 113, might be provided separately from a PSDL auto routing tool for routing based on user defined region(s) (see 114), and the PSDL routing tool might operate on a schematic in order to generate at least an initial layout power and ground network maintained in layout data 133 discussed herein. In some embodiments, the various components, or the functions, of the electronic design system 110 are combined or separated into different components from those illustrated. In some embodiments, the electronic design system is implemented within a cloud computing platform and may utilize one or more resources of the cloud. In some embodiments, the cloud computing system is provided by a third party to a user, where the user uses a user station (e.g., user station 100) to connect to the cloud computing system and to control the operations of the electronic design system. In some embodiments, only a portion of the electronic design system is provided on the cloud system, such as the schematic design tool 111, the layout design tool 113, and/or the power/ground structure description language (PSDL) auto routing tool for routing based on user defined region(s) 114. In some embodiments, any combination of storage 120 and/or 130, or portions thereof, are provided by, or connected to, the cloud computing system.

The schematic design tool 111 comprises a tool for creating and/or modifying a schematic of a circuit design. For instance, schematic design tools are generally known in the art and comprise different components for different types of design activities. For instance, one circuit design component might comprise an interface for accepting a hardware description or portion thereof as described by a hardware design language (e.g., Verilog, VHDL, etc.). Another circuit design component might comprise a circuit design component for manually manipulating/creating a circuit design using a circuit schematic. Generally, the schematic design tool 111 operates on schematic data (e.g., schematic data 121 stored in database 120) and can be used to generate a circuit schematic used in semiconductor/electronics manufacturing. In some embodiments, the schematic design tool can represent/synthesize a netlist for a circuit schematic for use by a power and ground network generation process as disclosed herein which may be contained/integrated within a layout design tool such as layout design tool 113.

The layout design tool 113, comprises a tool for creating and/or modifying a layout of a circuit design. For instance, layout design tools are generally known in the art and comprise different components for different types of design activities that provide a representation of a physical form of a netlist. For instance, a layout design component might comprise a layout editor for modifying/creating layers of a design as they would be constructed on a semiconductor substrate or printed circuit board. Generally, the layout design tool 113 operates on layout data (e.g., layout data 133 stored in database 130 and using information associated with a technology/process as embodied in technology/process data 122 in database 120) and can be used to generate a circuit layout used in semiconductor/electronics manufacturing that corresponds to a netlist commonly generated using a schematic design tool (e.g., 111). In some embodiments, the layout design tool 113 and/or the electronic design system 110 is modified to include a power/ground structure description language (PSDL) auto routing tool for routing based on user defined region(s) 114. The operation of the PSDL auto router 114 will be described further below. Briefly, the process uses a description of a power and ground structure to automatically generate a power and ground network pursuant to that description.

The system includes a database 120 which as illustrated includes schematic data 121 and technology/process data 122, and database 130 which as illustrated includes layout data 133 and power and ground structure data 134. In some embodiments, the database 120 and 130 comprises a single database with one or more subsets within the database for the different types of data as illustrated in FIG. 1. However, in some embodiments the database comprises multiple separate databases on different computing systems and/or in different locations connected via electronic communication links (e.g., wired and/or wireless networks). The system may further include a database access module(s) for accessing and storing relevant data, whether stored at a single database or at multiple databases.

The schematic data 121 comprises any type of representations of a schematic of a circuit design. For instance, the design data comprises any one or more of a hardware descriptive language design, a circuit schematic design, netlist, or any combination thereof. The layout data 133 comprises any types of representations of a physical form of a circuit design. For instance, the design data comprises a circuit layout consisting of a plurality of shapes on a plurality of layers.

The technology/process data 122 comprises any relevant process parameters for a target node of a given design. Generally, the technology/process data 122 is used by the layout design tool 113 and the PSDL auto routing tool 114 to generate a physical design that is compliant with the relevant technology/process data 122. For example, the power and ground structure data 134 indicates one or more shapes on respective metal layers that are to be placed such that they do not violate any spacing rules indicated in the technology/process data 122.

The power and ground structure data 134 comprises a representation of the PSDL description of one or more power and ground networks for respective layouts. For example, the power and ground structure data comprises any combination of a user generated PSDL document, a database representation of a user generated PSDL document, power and ground mesh structures used for guiding placement of PSDL shapes, or the PSDL shapes.

FIG. 2 illustrates a flow for power and ground network generation according to some embodiments. Generally, the process occurs in stages where each successive stage is associated with further refinement of a power and ground network.

The process starts at 200, where a design schematic, a technology library, and a PSDL description are identified. The design schematic may be embodied as a circuit design in the schematic data 121 of storage 120. Similarly, the technology library might be maintained in, or derived from, the technology/process data 121. The PSDL description is provided by a user who created the PSDL description specifically for a particular design to be processed or for a different design to be adapted by the user to suit a current design under development. For example, the process might be triggered by the user selection of a process to generate the power and group network and identification of the design schematic, the relevant technology library for which the device to be manufactured, and a PSDL description. In some embodiments, the PSDL description or the design schematic identifies the relevant technology library to be used.

In some embodiments, after the relevant information is identified, the process performs a fast power and ground routing based on the PSDL description at 202 for one or more user defined regions. In the fast generation process, the PSDL auto routing tool implements the generation with little or no processing to identify errors, such as design rule checking (DRC). In this way, the speed in which the structures are greatly improved. Furthermore, because the process can, relatively speaking, quickly generate a power and ground structure, that structure can be analyzed to determine if sufficient power would be provided to the relevant circuit elements and feedback could be provided to the system/user and to enable rapid optimization. The fact that the regions user defined can be of particular importance at this stage at least because this is before the placement, clock tree synthesis (CTS), and routing, which means that design level block instances have not yet been placed within the design, and therefore cannot be relied on to determine how to generate the power and ground structures. In some embodiments, this process is implemented with a machine learning process to further improve the optimization. For example, a machine learning process could utilize a database of prior optimizations implemented by users for different circumstances that are matched using a set of normalized parameters. The fast generation process is discussed in more detail in FIGS. 3A-3D.

At 204, a complete power and ground synthesis is performed for the one or more user defined regions. Generally, the process either starts with the results of the fast routing process or performs the steps of the fast routing process, before performing additional processing of the power and ground network. This process will be discussed further below at least in regard to FIG. 4.

At 206 placement, clock tree synthesis (CTS), and routing is performed. These processes are generally known in the art and are not the focus of the invention as described herein. Thus, each will be described only briefly herein. Placement is the process of placing the elements of a circuit design at a particular location and having a particular orientation within a layout area. For example, an instance of an inverter is placed at a location and having an orientation at a given offset from an origin point of an area of a design. Clock tree synthesis may comprise generation of a fan-out structure for transmitting one or more clock signals to different elements within a layout area. The main goal of clock tree synthesis is to provide for the distribution of clock signals while minimizing skew and arrival time variation/delay. Routing is the process to connect the placed circuit elements to the corresponding inputs and outputs of other circuit elements as specified by a design schematic and at least as embodied in a netlist.

After the placement, CTS, and routing is performed, at 206, the power and ground network is analyzed in a post processing step to correct any DRC violations that may still exist, including DRC violations that are due to the placement, CTS, and routing at 206. This will be discussed further in regard to FIG. 5.

Figure 3A:
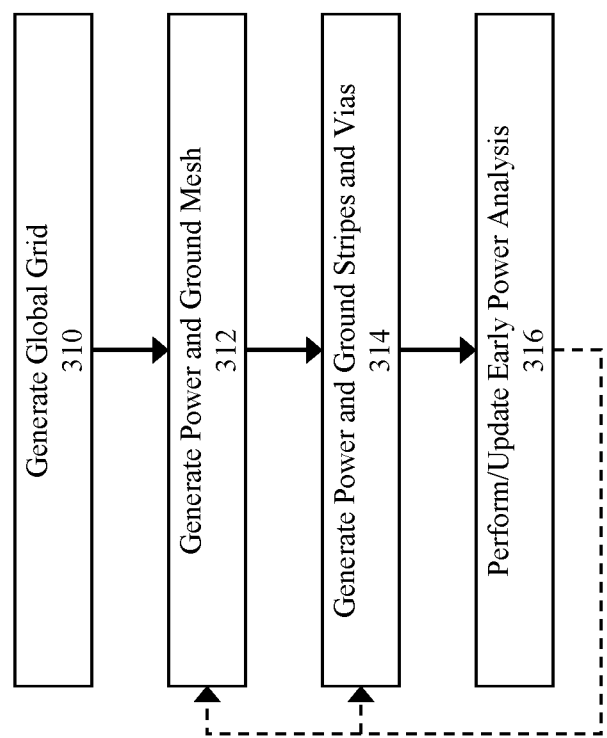
FIGS. 3A-3D illustrate example flows for fast power and ground routing from FIG. 2 according to some embodiments.
Figure 3B:
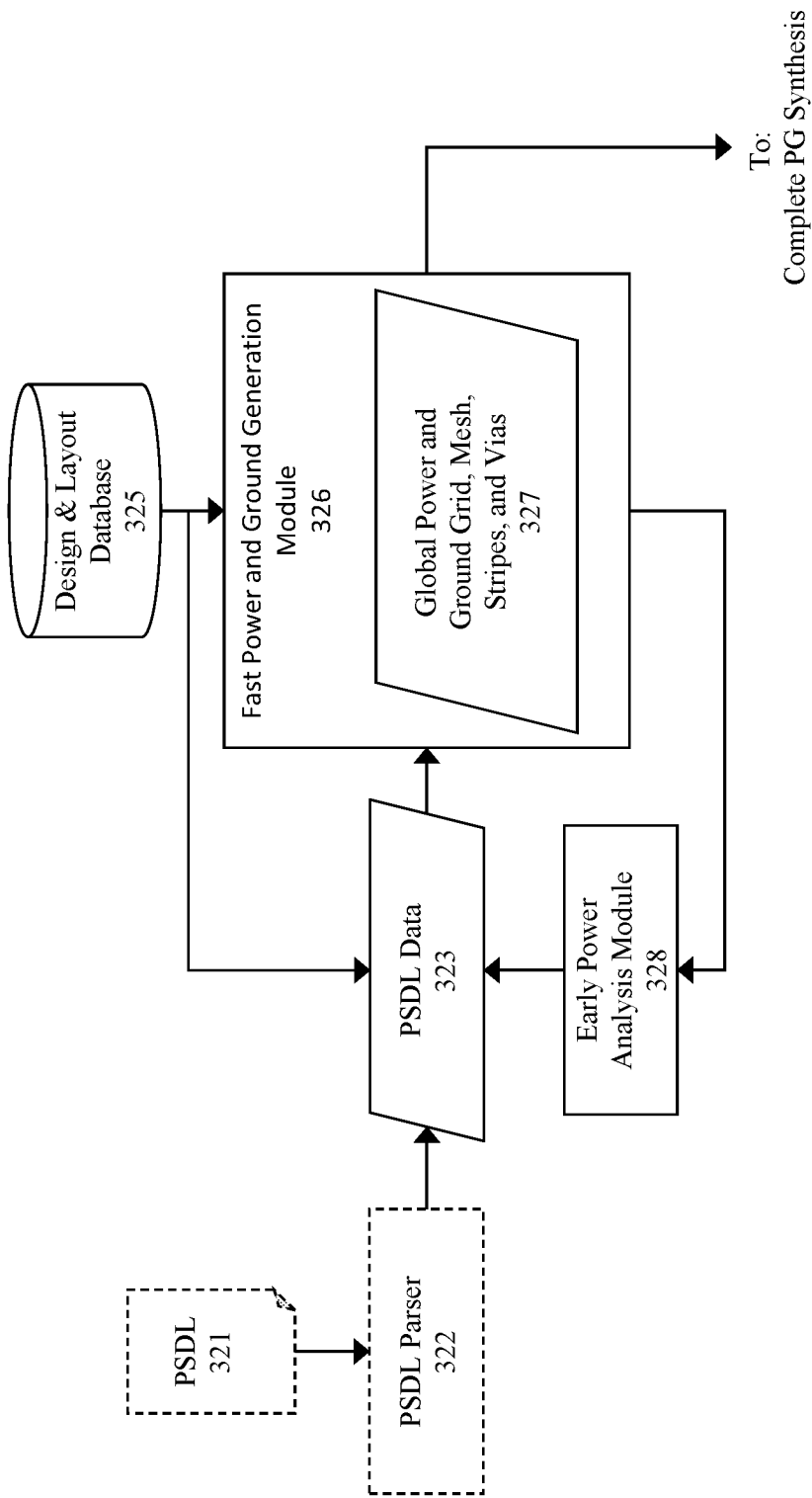
Figure 3C:
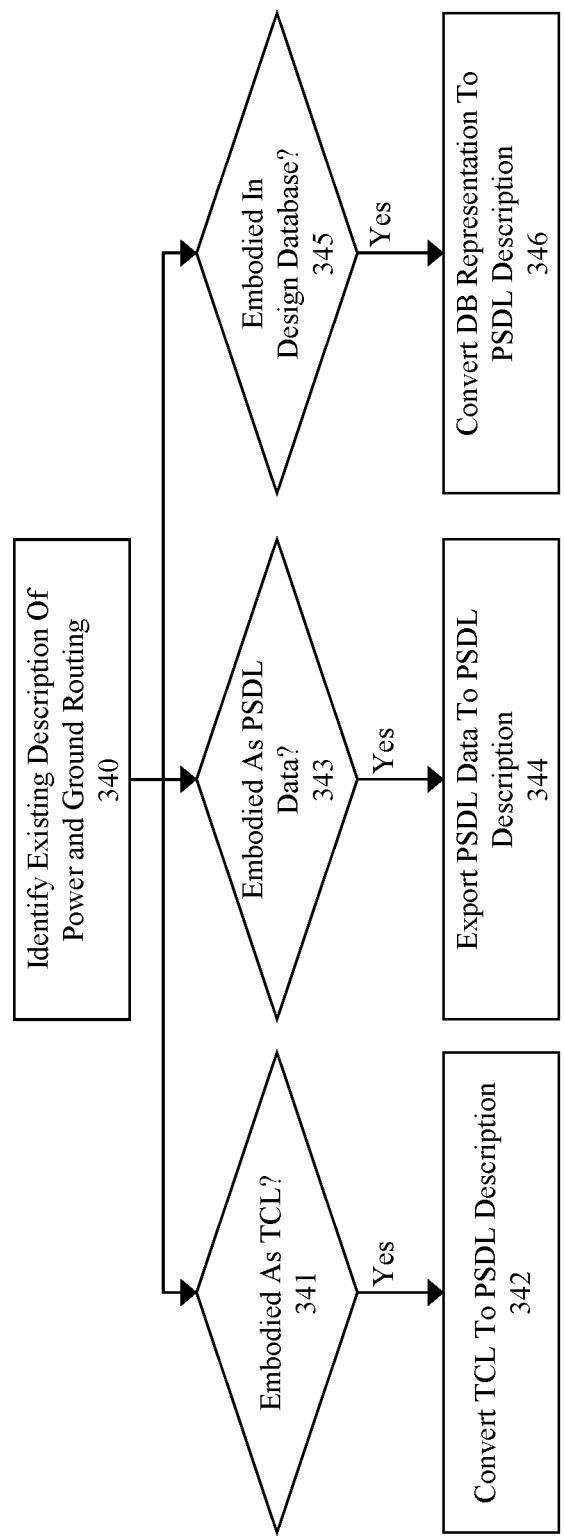
Figure 3D:
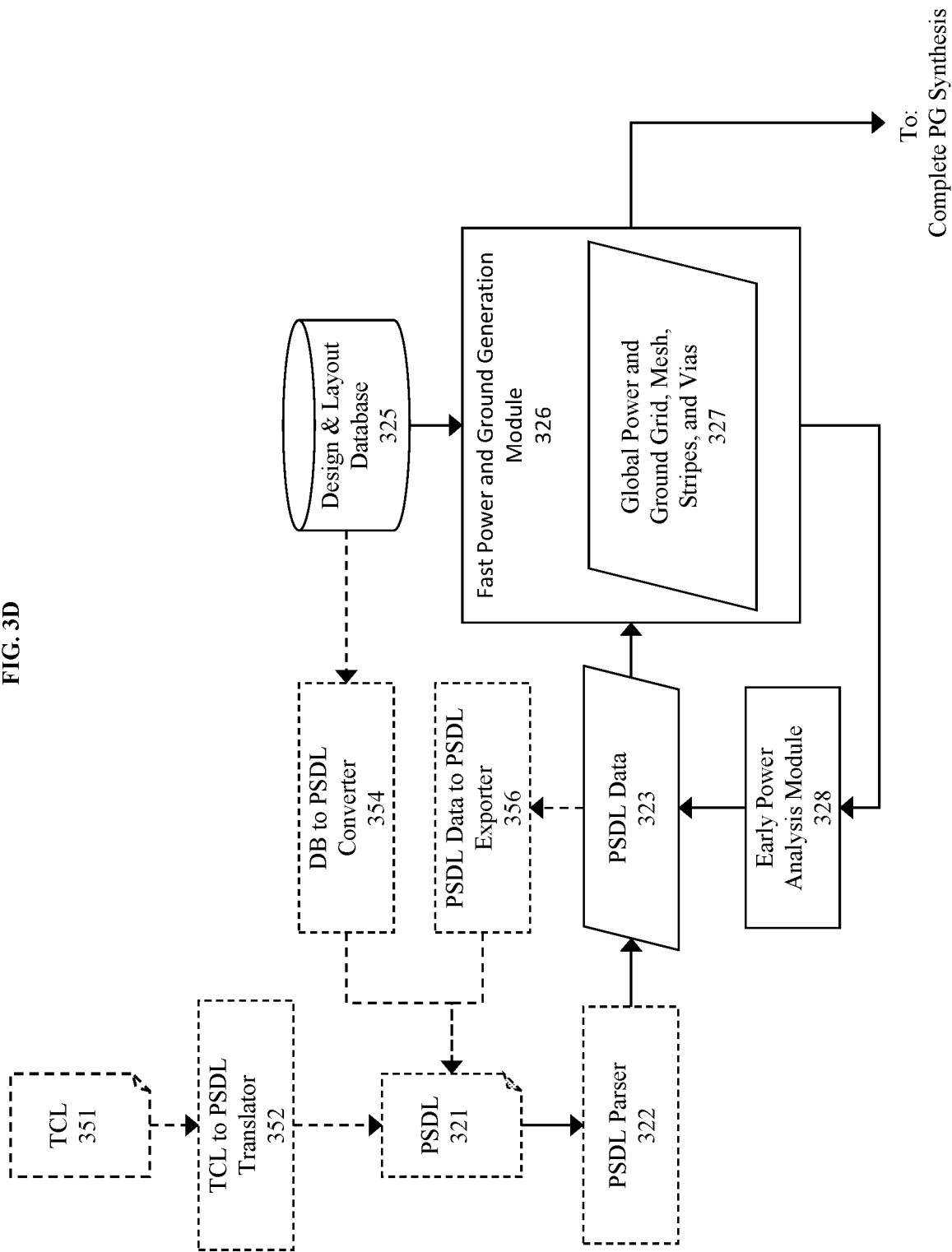

FIGS. 3A-3D illustrate example flows for fast power and ground routing from FIG. 2 according to some embodiments. FIGS. 3A-3B are directed to a basic fast routing process, whereas FIGS. 3C-3D illustrate added features to improve usability.

FIG. 3A is directed to a basic flow for the fast routing process according to some embodiments. Generally, FIG. 3A illustrates a feedback loop used to generate, analyze, and iteratively improve a generated power and ground network.

Initially, at 310, the process generates a global grid used for maintaining alignment across the user defined regions. This global grid is a logical representation of guides for use in routing the structures of the power and ground network, and thus generally does not actually comprise shapes to be created in a final design.

At 312, the power and ground mesh is generated for each user defined region. This will normally comprise multiple steps. For example, the process may include building contours for user defined regions, generating exception areas, building rings from the generated contours for the user defined regions, building major and minor patterns.

At 314 additional power and ground structures are generated such as follow-pins, stripes, and staples, building via templates and vias using those templates, connecting stripes to corresponding rings in each user defined region, connecting pad pins to rings, and generating pad rings. Here it is important to note that the regions here are not tied to any underlying design blocks but are instead defined independently by a user. In fact, the fast generation occurs before the actual placement of the circuit elements and thus, is separate from the block/block instance constructs used in circuit design. Instead, those blocks would be placed in the design at a location and later time.

At 316 early power analysis is performed. Generally, this comprises generation/identification of estimates of the power required in different regions of the chip and analysis for power issues such as IR-drop analysis. In the event that an IR-drop issue is identified, the early power analysis process can indicate where the issue occurs in a relevant region and the system can suggest to a user or can automatically generate additional current carrying elements such as stripes and staples. Once the power analysis is completed the process may trigger the modification of the power and group network at 312 and/or 314.

FIG. 3B is directed to an architecture for implementing the basic flow for the fast routing process according to some embodiments.

Generally, the architecture operates on design data from the design & layout database 325. The design & layout database 325 may comprise corresponding portions of storage 120 and/or storage 130. In some embodiments, the process starts with a PSDL description in the form of a file 321. The PSDL file 321 may be input into a PSDL parser 322 to generate a database or machine-readable representation 323. In some embodiments, the PSDL data is embodied by a number of database entries in the design & layout database 325 (see e.g., Power and Ground Structure data 134). The design data and the PSDL data is then provided to the fast power and ground generation module 326. This data is then processed to generate the global power and ground grid, mesh, stripes, and vias which are captured in 327. This generated information is stored in the layout data (e.g., 133), the power and ground structure data (e.g., 134) or some combination thereof. This process may be completed as discussed above in regard to FIG. 3A.

After the generation of the global power and ground grid, mesh, stripes, and vias captured at 327, the structure can be analyzed by an early power analysis module 328 as discussed in regard to 316. Subsequently, the process may iteratively generate modified PSDL Data to create modification to existing global power and ground grid, mesh, stripes, or vias, or creation of new global power and ground grid, mesh, stripes, or vias as a result of IR-drop analysis.

FIG. 3C is directed to a more feature rich flow for the fast routing process according to some embodiments. Generally, FIG. 3C is directed towards support for existing forms of power and ground routing representations.

Initially, an existing description of power and ground routing is identified. For example, the existing description could comprise any one or more of a TCL embodiment, a PSDL data representation, or an embodiment in a database. Each embodiment may be identified (e.g., via user provided input) and is then processed according to its type. For example, if the power and ground routing is embodied as TCL as determined at 341, that TCL is converted to a human readable PSDL description at 342. if the power and ground routing is embodied as PSDL data as determined at 343, that PSDL data is exported to a human readable PSDL description at 344. Whereas, if the power and ground routing is embodied in a design database as determined at 345, that database representation is converted to a human readable PSDL description at 346.

FIG. 3D modifies the architecture of FIG. 3B to include the added features discussed in FIG. 3C according to some embodiments.

For example, a TCL embodiment is illustrated at 351 where TCL file is input into a TCL to PSDL translator 352 to generate the PSDL description at 321 that is subsequently parsed and processed. In the event that the PSDL description 321 is not retrieved or available but PSDL data 323 is, the process can export the PSDL data to a PSDL description using the exporter at 356. Alternatively, a PSDL description 321 could be generated based on the design & layout database 325 using a database to PSDL converter 354.

Figure 4:
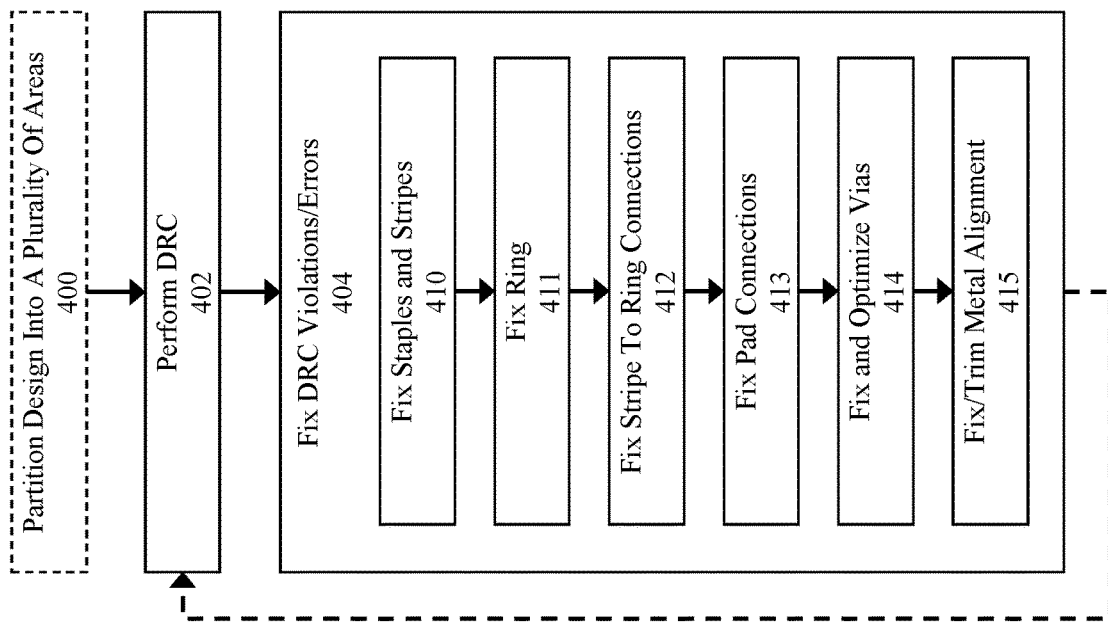
FIG. 4 illustrates an example flow for complete power and ground synthesis from FIG. 2 according to some embodiments.

FIG. 4 illustrates an example flow for complete power and ground synthesis from FIG. 2 according to some embodiments. In some embodiments, the complete power and ground synthesis process includes some or all fast power and ground routing flow discussed above. In some embodiments, the complete power and ground synthesis process does not include the process of the fast power and ground routing but instead operates on what was created in the fast routing process. As illustrated here, the complete power and ground synthesis is discussed as if the operations of the fast power and ground routing has already been completed.

In some embodiments, the process starts at 400 where the design is partitioned into a plurality of areas. Generally, partitioning is performed to decrease the amount of resources required to perform the DRC check at any given time. For example, if a design is divided into 128 different areas then the memory requirements for processing one of those areas as opposed to the entire design may be decreased in a similar manner (excluding some additional overhead needed to manage the partitions).

At 402 a DRC process is performed on the results of the fast routing process which were generated with little or no processing to identify DRC errors/warnings. As a result of this processing one or more errors/warnings may be identified. Each of which may be addressed in turn.

For example, at 404 any errors identified at 402 are processed in an attempt to correct those errors/warnings. The correction process generally starts from lower-level elements and proceeds by selecting subsequent higher-level elements. This is, logically speaking, simpler because the lower-level elements can normally be fixed with less effect on the higher-level elements. Furthermore, the process may be iterative in that after DRC violations/errors are corrected the DRC analysis can be performed again at 402, whether triggered automatically or by a user.

Violations involving staples and stripes are fixed 410. As will be discussed more below, staples connect stripes or circuit elements, and stripes connect to respective rings. Unfortunately, staples and stripes might be placed in the wrong location or be too close to other elements.

Ring violations are corrected at 411. As will be discussed further below, rings are generated around the user defined regions and are used to provide source voltages (e.g., power and ground) to corresponding stripes within a respective user defined region. However, just as stripes and staples can be too close to other elements so can the shapes that make up the rings.

At 412, errors regarding stripe to ring connections are corrected. For example, if a given stripe is too short then that stripe might be lengthened to make contact with the corresponding ring. Likewise, if a stripe is too long, that stipe might be shortened to avoid contact or encroachment of another shape. In some embodiments, a stripe to ring connection cannot be made simply by extending a stripe because that extension would violate a spacing requirement. If extending the stripe would violate a spacing requirement the PSDL auto routing tool can allow the strip to be connected using one or more jogs in the shape such that shape is essentially constructed from multiple rectangular elements instead of a single rectangular element.

At 413, pad connections are fixed. Pad connections provide a path for power from outside the user defined region/circuit to be connected to a ring for a particular user defined region within the circuit. Where those connections violate spacing requirements or are not properly connected, the process fixes the issue by modifying the shape appropriately.

At 414, vias are optimized for current flow and to avoid violations. For example, multiple vias may be used to replace a single via to increase the current carrying capacity with a lesser IR-drop. Additionally, in the event that the density of vias in a given area is too great, the process can decrease the amount of vias in that area, while possibly increasing the density of vias elsewhere in a user defined region to compensate.

At 415, metal alignment issues are corrected, including correction of shapes that are too close together, and shapes that extend beyond an area which may cause a DRC violation.

Figure 5:
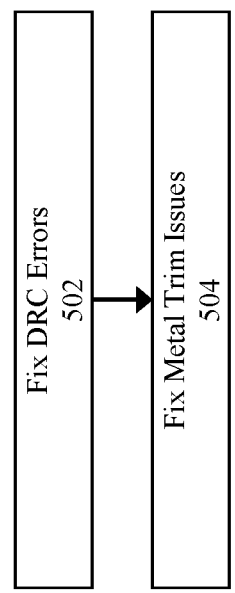
FIG. 5 illustrates an example flow for post-routing power and ground processing from FIG. 2 according to some embodiments.

FIG. 5 illustrates an example flow for post-routing power and ground processing from FIG. 2 according to some embodiments. Post-routing errors are generally errors that result from the placement and routing of elements for an integrated circuit to be manufactured.

After placement, CTS, and routing (see e.g., 206) any remaining/resulting errors/warnings are identified and preferably corrected. This may include at least some of the processing describe in FIG. 4. For example, general DRC errors that then exist can be corrected at 502. For example, one of the more likely errors are metal trim issues which are corrected at 504.

PSDL Description

In some embodiments, a power and ground structure description language (PSDL) comprise a syntax used to define different shapes to be generated within an integrated circuit. An example description is discussed in the following passages including example illustrations (see FIG. 6A-11) according to some embodiments.

The primary aspect of the PSDL are PATTERN statements, which are used to describe metal patterns to be instantiated and generated within respective user defined REGION(s). The PATTERN statements describe patterns in an independent form from regions and layers. However, these PATTERN statements can be instantiated in specified user defined regions and user specified layers. Additionally, the PSDL auto routing tool can automatically extract min/default width/spacing/min-max length/min area and other relevant parameters from design rule information such as in a technology document (e.g., LEF file). When instantiated, patterns will be provided within a user defined region. Specifically, a user will define a region (e.g., digital I/O region) having user specified boundary. In addition to specifying the pattern to be instantiated in each user defined region, the user also specifies layer(s) in which to instantiate those patterns. Furthermore, where those patterns are described using min/default language, the corresponding min/default values can be used for the particular design (e.g., based on the design rule information). Not only does this allow for patterns that can be used on multiple layers with different expressions on those layers, but this also allows for improved design reuse as those values can automatically be associated with different values when used for a different technology node.

Generally, a statement is defined by the following notation: {statementName attributes}, where statementName is the name of the statement and attributes are all the required corresponding attributes that defines the current statement and possibly one or more options attributes.

A Phrase is a set of one or more keywords, identifiers, or values that form an attribute for a statement. If a set of keywords in a phrase is optional, this optional condition(s) will be enclosed in square brackets: e.g., [optional keywords]. If the same phrase can be repeated more than once, an ellipsis sign will be used to indicate such condition (e.g., phrase . . . ). If different keywords can be used in a phrase, then the possible choices will be listed, separated by '|', and the whole options will be enclosed by parenthesis (unless if the whole options are optional in which a square bracket will be used instead):

(option1|option2|option3)—one of the options must be specified

[option1|option2|option3]— one of the options can be specified or none

Set notations and definitions are as follows. A set is noted as: x1 x2 xn, where xi is the member of the set at the $i^{th}$ position. If one or more set members are repeated, the following repeat clause can be used: [k: xj xj+1 xj+2], which indicates that the member xj, xj+1, and xj+2 are repeated k times in the set. For example, an original set can be written as follows: {a b c d b c db c d e f}. However, that same set can be rewritten as: {a [3: b c d] e f}. If k is replaced with '*', the set members inside the repeat clause will be repeated indefinitely, thus when '*' is used, there should not be any set member after the repeat clause because they will be ignored. A primary set is a mandatory set that represents the actual number of objects in a set-group (primary set cannot use '*' in the repeat clause). A set-group is a collection of one or more sets that consists of exactly one primary set and zero or more non-primary sets. An attribute set is an optional set that provides additional attribute information to the set member in the primary set. There can be more than one attribute set in a set-group. An object in the attribute set follows an object in the primary set that is at the same position. If the number of attributes in the attribute set is less than the number of the primary set, then the last attribute in the set will be used to fill in the missing attributes. If the number of attributes in the attribute set is more than the number of the primary set, then all attributes beyond the number of primary set will be discarded. An example is as follows: a primary set is {x1 x2 x3 x4 x5}, and Attribute set 1 is {a1 a2 a3} with the missing attributes filled in as follows: {a1 a2 a3 a3 a3}. An Attribute set 2 is {b1 b2 b3 b4 b5 b6 b7 b8} with the extra attributes discarded as follows {b1 b2 b3 b4 b5}.

The main format for PSDL is as follow: {PATTERN statements}, [{AREA statements}], [{EXCEPTAREA statements}], and {REGION statements}.

A pattern statement comprises a pattern template that follows the framework below and defines the pattern template to be used for constructing the power and ground structure. The same pattern template can be used multiple times for different layers and can have different expressions on different layers and even different technology nodes. TYPE indicates a pattern type which may be a FOLLOWPIN, STRIPE, or STAPLE. DIRECTION indicates the direction or orientation of a metal shape. If not specified, a layer routing direction will be used for the shapes. WIDTH specifies the number of metals in the current pattern as well as the width for each metal. If DEFAULT keyword is used (instead of actual width value), then default metal width for the given layer will be used. Similarly, a non-default width is used if the specified NONDEFAULTRULE name is used. SPACING specifies the spacing/distance required between two adjacent metals in the same pattern. This is optional if there is only one metal shape in a given pattern. The value for the spacing can be an absolute spacing value or one of the following: TRACK numTracks defines spacing by the number of routing tracks away from the previous metal; PITCH numPitches defines spacing by the number of routing pitches away from the previous metal (measured center-to-center); or MINSPACING specifies that the use of the minimum spacing defined in the library for the current layer based on the given wire width and length. LENGTH specifies the minimum and maximum metal length for STAPLE type. This attribute is ignored for FOLLOWPIN or STRIPES.

{PATTERN patternName
  {TYPE (FOLLOWPIN|STRIPE|STAPLE)}
  [{DIRECTION (HORIZONTAL|VERTICAL)}]
  [{WIDTH (width$_i$|DEFAULT|nonDefaultRuleName) . . . }]
  [{SPACING (spacing$_i$|MINSPACING|{TRACK numTracks}|{PITCH numPitches}) . . . }]
  [{LENGTH minLength maxLength}]
}

FIGS. 6A-6D illustrate example patterns for power and ground structures according to some embodiments. The illustrations include staple and stripe patterns.

Figure 6A:
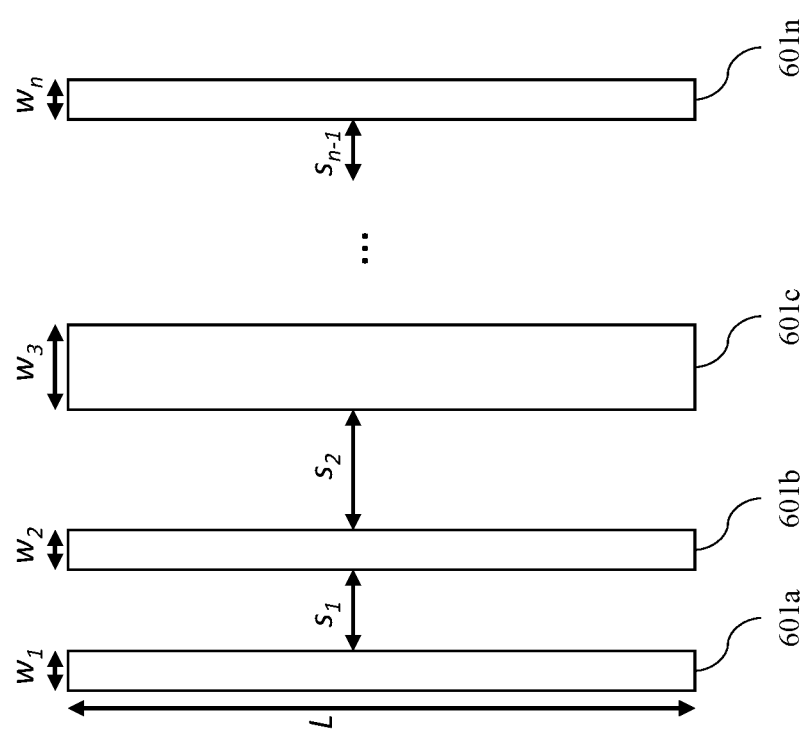
FIGS. 6A-6D illustrate example patterns for power and ground structures according to some embodiments.

FIG. 6A illustrates an example staple pattern having set widths, spacing, and min/max length. The pattern is identified by the name "pattern1" which can be used to instantiate the pattern on any number of layers.

As illustrated here, pattern1 would generate staples that are vertically aligned and have specified widths, spacing, and length.

For example, pattern1 might comprise the following where Lmin<=L<=Lmax:

{PATTERN pattern1
  {TYPE STAPLE}
  {DIRECTION VERTICAL}
  {WIDTH w1 w2 w3 wn}
  {SPACING s1 s2 sn−1}
  {LENGTH Lmin Lmax}
}

Specifically, pattern1 comprises shapes 601*a-n* having widths w1, w2, w3, wn respectively with horizontal spacing between those shapes of s1, s2, sn−1, and a length L between Lmin and Lmax).

Figure 6B:
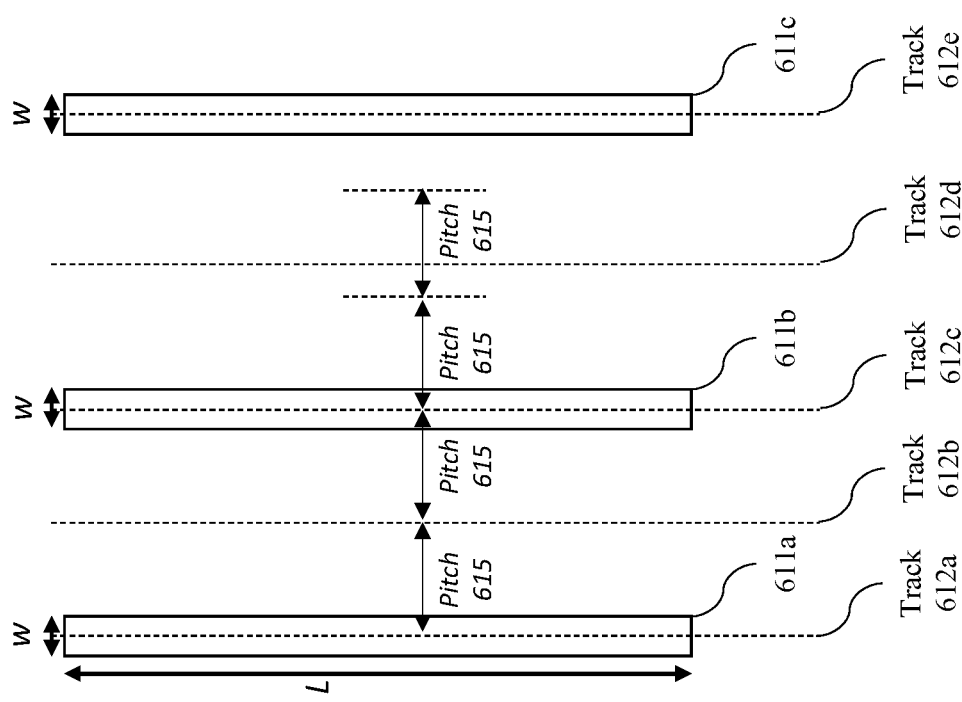

FIG. 6B illustrates an example staple pattern having widths that are the default for the layer the pattern is instantiated on, track based spacing, and a specified length. The pattern is identified by the name "pattern2" which, similar to pattern1, can be used to instantiate the pattern on any number of layers. However, because the width and spacing is determined based on the instantiation layer, this pattern may be instantiated differently on different layers.

As illustrated here, pattern2 would generate staples that are vertically aligned with layer default widths, track based spacing, and a specified length L.

For example, pattern2 might comprise the following:
{PATTERN pattern2
   {TYPE STAPLE}
   {DIRECTION VERTICAL}
   {WIDTH DEFAULT DEFAULT DEFAULT}
   {SPACING {TRACK 2}{TRACK 2}}
   {LENGTH L L}
}

Specifically, pattern2 comprises shapes 611a-c having widths w which are the instantiation layer default with horizontal spacing between dependent on locations of respective tracks (see tracks 612a-e). This is in contrast to a distance based spacing such as might be used for a center-to-center pitch based spacing (see pitch 615). Note that here, the tracks are not always aligned to the pitch. Additionally, pattern2 specifies that the spacing between each staple is 2 tracks.

Figure 6C:
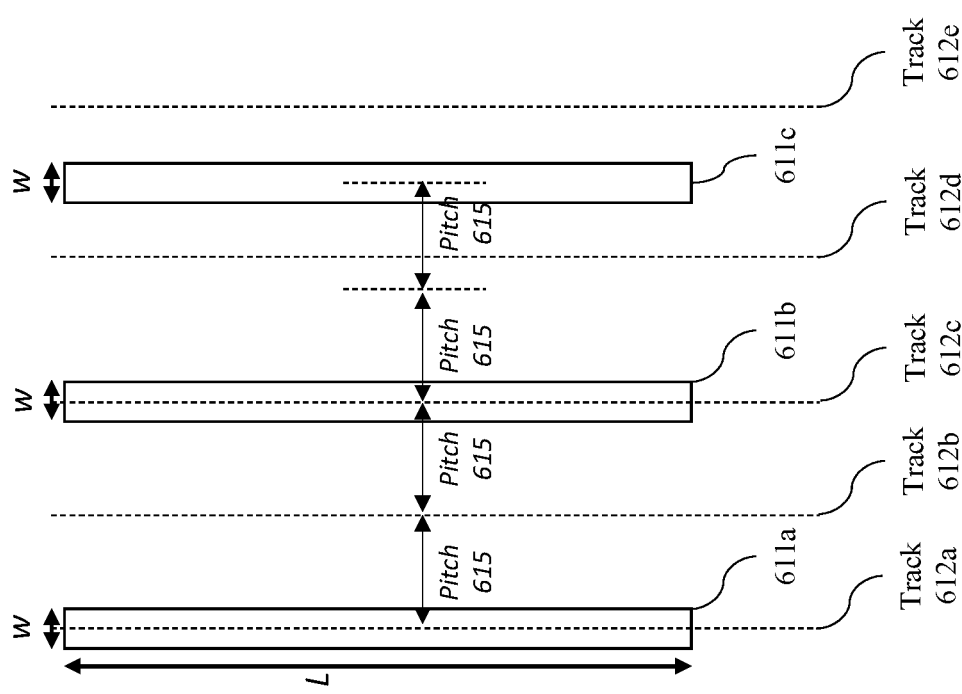

FIG. 6C illustrates an example staple pattern (pattern3) that is the same as pattern2 but for the spacing being based on the pitch. As can be seen from this example, when the pitch is used to determine the spacing and the pitch and track positions do not match, some or all shapes may not fall on a track (see 611c which is no longer centered on a track).

For example, pattern3 might comprise the following:
{PATTERN pattern3
   {TYPE STAPLE}
   {DIRECTION VERTICAL}
   {WIDTH DEFAULT DEFAULT DEFAULT}
   {SPACING {PITCH 2}{PITCH 2}}
   {LENGTH L L}
}

Figure 6D:
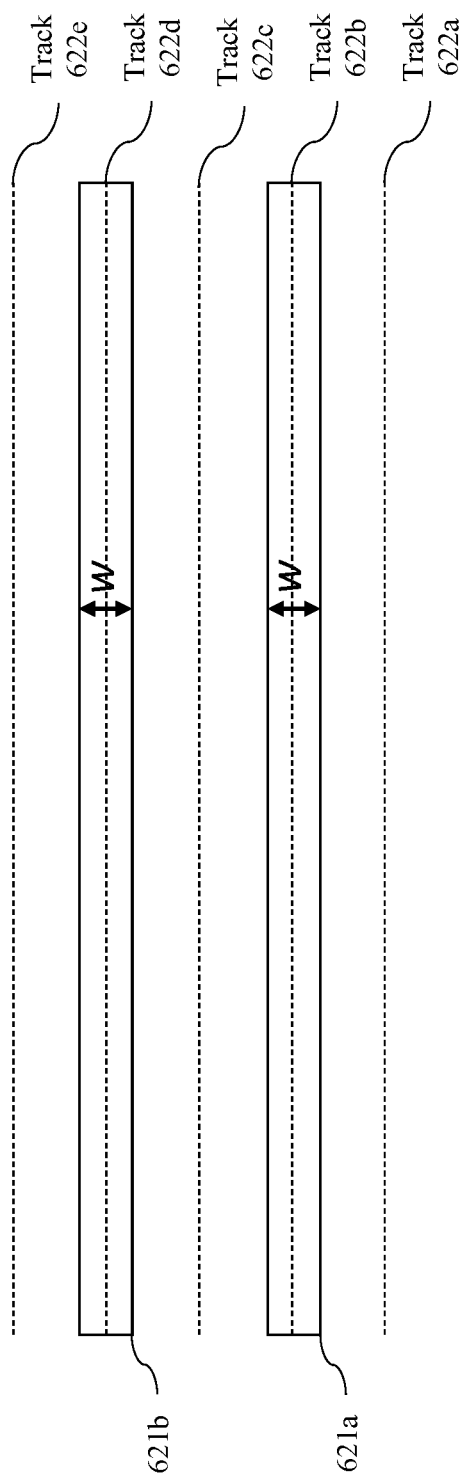

FIG. 6D illustrates an example stripe pattern that is largely similar to pattern2.

However, whereas staples have a length attribute, stripes do not, as stripes are automatically routed to the corresponding portion of the ring structure (barring modification to correct for DRC errors). Additionally, here the illustration includes stripes (see 621a-b) arrange horizontally with a 2-track spacing (see tracks 622a-e).

The stripe pattern4 might comprise the following:
{PATTERN pattern4
   {TYPE STRIPE}
   {DIRECTION HORIZONTAL}
   {WIDTH DEFAULT DEFAULT}
   {SPACING {TRACK 2}}
}

Figure 7:
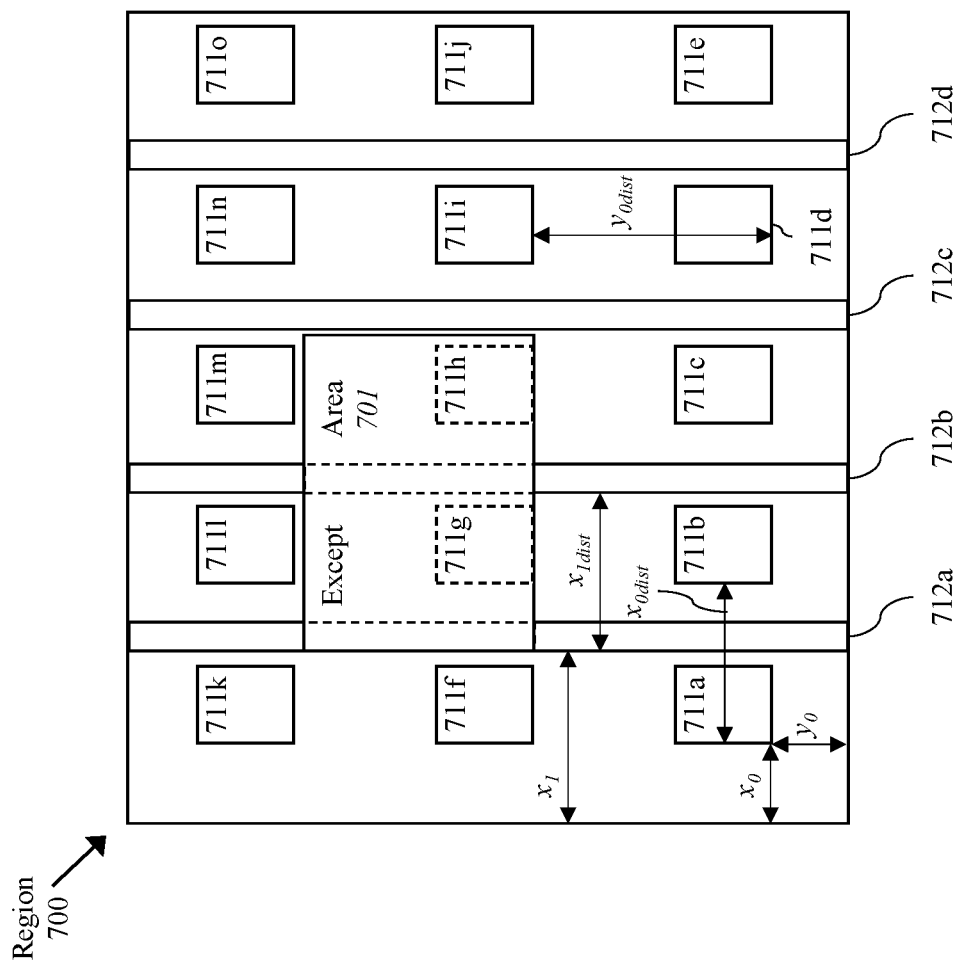
FIG. 7 illustrates an example user defined region including an exceptarea, a staple pattern, and a stripe pattern according to some embodiments.

FIG. 7 illustrates an example user defined region including an except area, a staple pattern, and a stripe pattern according to some embodiments.

Regions (e.g., region 700) are defined using user defined areas that are specified with AREA statements. These AREA statements define a set of areas (defined by one or more rectangles or polygons) that can be used to specify a user defined region (in REGION statements) or exception areas (in EXCEPTAREA statements). The area set is identified by the areaSetId. A rectilinear area can be described by a polygon that contains four or more of x-y pairs representing points in polygon, whereas a rectangular area can be described using only two x-y pairs. For example, an area statement might read as follows: {AREA areaSetId ({xL1 yL1 xH1 yH1}{x1 y1 x2 y2 x3 y3 x4 y4})}.

Region statements define a region(s) where the power and ground structure will be constructed. Each region is defined by one of the following: the union of all user defined areas, the union of all specified power domain, standard cell rows, or in some embodiments all block macro area. In this way, the regions/areas can be entirely independent of any block macro areas. In some embodiments, only one definition can be used per region syntax. AREA defines the set of areas for power and ground structure. POWERDOMAIN defines the power and ground construction area based on specified power domains. ROWONLY specifies that power and ground generation is only on standard cell rows. ALLBLOCKS specifies that power and ground generation is only on BLOCK macro area(s). IOAREA specifies that an area for power and ground generation is outlined by the inside boundary of input/output (I/O) pins. CORE specifies that the AREA for power and ground generation is inside a CORE region. If no area attribute is defined, by default the CORE area is used. EXCEPTAREA defines a set of areas to be avoided when generating the power and ground structure. EXCEPTAREAs can be defined for all layers or individual layers. EXCEPTAREAs that do not overlap with the current region will have no effect in the non-overlapping region. RING defines a ring structure for connecting to stripes in a region. This ring will be used as the end-point connection for any stripes generated inside a respective region. LAYER defines the metal layer for constructing the power and ground stripes/staples for the current region. Patterns (e.g., the discussed pattern templates) can be instantiated within the respective layer statements. A region statement follows the following example syntax:
{REGION
   [{AREA (areaSetId|{xL1 yL1 xH1 yH1} ... {x1 y1 x2 y2 x3 y3 x4 y4 ... } ... )}]
   [{POWERDOMAIN powerDomainName ... }]
   [{ROWONLY|ALLBLOCKS||OAREA|CORE}]
   [{EXCEPTAREA exceptAreaId}]
   [{RING statements} ... ]
   [{LAYER statements} ... ]
}

Rings (see FIGS. 11A-11B) provide for connection to corresponding sources/sinks (e.g., Vdd/Vss). A ring statement has the following example syntax:
{RING
   {INNER|OUTER}
   {LAYER (layerAll|layerTop layerBottom layerLeft layerRight)}
   {NET [USEGROUP] net1 net2 netn}
   {WIDTH (widthAll|widthTop widthBottom widthLeft widthRight)}
   {OFFSET (offsetAll|offsetTop offsetBottom offsetLeft offsetRight)}
   {SPACING (spacingAll|spacingTop spacingBottom spacingLeft spacingRight)}
}

EXCEPTAREA 701 illustrated here is specified within region 700. An EXCEPTAREA statement defines one or more areas excluded from power and ground routing. SPACINGHALO statement defines an additional space clearance around the predefined area that need to be added (e.g., to avoid any possible error or violation against the object in the exception area). An EXCEPTAREA statement has the following example syntax where only one of the AREA, BLOCK, and POWERDOMAIN can be used for a given EXCEPTAREA:
{EXCEPTAREA exceptAreaId
   [{AREA (areaSetId {xL1 yL1 xH1 yH1} ... {x1 y1 x2 y2 x3 y3 x4 y4 ... } ... )}]
   [{BLOCK blockMacroName}]
   [{POWERDOMAIN powerDomainName}]
   [{SPACINGHALO sx sy}]

As illustrated, the EXCEPTAREA 701 comprise a rectangle that can be specified by:

```
{EXCEPTAREA ex1
    {AREA {x'L1 y'L1 x'H1 y'H1}
}
```

Layer statements define power and ground metal constructions for a given layer. An example statement is provided below and includes various terms discussed here. ONGRIDONLY, if specified, provides that all metals in this layer must be snapped to nearby routing track. RESPECT whether power and ground metals have to avoid any existing clock routing (if CLOCK is specified) or signal routing (if SIGNAL is specified). By default, it will ignore any existing non-power and ground routing (NONE).

```
{LAYER layerName
    [{ONGRIDONLY}]
    [{RESPECT (NONE|CLOCK|SIGNAL)}]
    {METAL statements} . . .
    [{VIA statements}]
    [{EXCEPTAREA exceptAreaId}]
}
```

Metal pattern replication statements specify the placement of instantiations of pattern templates in the design. In some embodiments, the placement of an instantiated pattern (patternName) is relative to another instantiated pattern which may be on the same or a different layer. NET specifies a net that corresponds to the wires (defined in WIDTH section of the pattern template). The order of the nets corresponds with the order of the wire defined in the pattern template. If the number of nets is less than the number of wires, then the last net in the list will be used for the remaining wires. SIZE specifies the number of replications of the corresponding pattern template. If the SIZE statement is missing, then the pattern will be replicated until it reaches the corresponding region boundary. Similarly, a "*" can be used to indicate unlimited replication. OFFSET specifies the offset coordinate of the first metal with respect to the lower-left coordinate in the enclosing region. Offset is measured from the low-left corner of the first metal. STEPDISTANCE defines the set-to-set distance (horizontal and vertical) between two pattern templates on the same layer. The additional keyword is used to specify how the distance is measured. LOWEDGETOLOWEDGE specifies that the distance is measured from the low-left corner of the first metal of the metal pattern to the low-left corner of the first metal on the second metal pattern on the same layer. CENTERTOCENTER specifies that the distance is measured from the center point of the first metal pattern box to the second metal pattern box on the same layer. EDGETOEDGE specifies that the distance is measured from the outer edge of the last metal in the pattern to the facing edge of the first metal in the next metal pattern. FOLLOW indicates that another metal pattern (metalPatternId) as reference is to be used to compute the coordinate for the current metal pattern. This is used to align the current metal pattern set with the pattern on different layer. Two references can be given, one for horizontal alignment and one for vertical alignment. ALIGNMENT controls how the current metal pattern will be aligned with the reference metal pattern defined with FOLLOW syntax. The alignment value is as follows: LOWEDGE which specifies aligning the low edge of the current pattern with the low edge of the reference pattern (left edge for horizontal alignment and bottom edge for vertical alignment); CENTER which specifies aligning the center line of the current pattern with the center line of the reference pattern; or HIGHEDGE which specifies aligning the high edge of the current pattern with the high edge of the reference pattern (right edge for horizontal alignment and top edge for vertical alignment).

The METAL syntax comprises the following:

```
{METAL metalPatternId patternName
    {NET net1 net2 . . . netn}
    [{SIZE (*|xnum) (*|ynum)}]
    [{OFFSET x0 y0 [FROM (REGION|CORE|DESIGN)]}]
    [{STEPDISTANCE xdist ydist [LOWEDGETOLOWEDGE|CENTERTOCENTER|EDGETOEDGE]}]
    [{FOLLOW syntax}]
    [{ALIGNMENT syntax}]
    [{EXCEPTAREA exceptAreaId}]
}
```

FIG. 7 illustrates two patterns which may each be provided in the same or different layers (e.g., layer M3). The first pattern (Pattern_Z) causes the generation of 711*a-o* illustrated in the figure. Pattern_Z might be instantiated as follows:

```
{METAL "MxStaple" pattern_Z
    {NET vdd}
    {OFFSET x0 y0}
    {STEPDISTANCE x0dist y0dist LOWEDGETOLOWEDGE}
}
```

The x0 and y0 offsets illustrated to offset for the first shape in the pattern. x0dist and y0dist illustrate the offset to be used in the x and y direction for subsequent shapes in the pattern. LOWEDGETOLOWEDGE specifies that the offsets should be applied from low edge to low edge. Thus, 711*a* has an offset of (x0, y0) for its lower left-hand corner. Each subsequent shape adds to this offset with x0dist and/or y0dist as appropriate. For example, 711*b* has an offset of (x0+x0dist, y0), 711*c* has an offset of (x0+(2*x0dist), y0), 711*d* has an offset of (x0+(3*x0dist), y0), and 711*e* has an offset of (x0+(4*x0dist), y0). It is similar for 711*f-j* but instead of using y0 for the Y coordinate, each shape uses y0+y0dist. Likewise, for 711*k-o* uses the offset of y0+(2*y0dist).

The second patter (pattern_A) causes the generation of 712*a-d* illustrated in the figure. Pattern_A might be instantiated as follows:

```
{METAL "MxStripe" pattern_A
    {NET vdd}
    {OFFSET x1*}
    {STEPDISTANCE x1dist*}
}
```

Pattern_A provides for the generation of a stripe, which as discussed previously is generated to span the entire length of a region. Thus, the relevant OFFSET is normally only in one direction. As illustrated here, the first stripe (712*a*) has an OFFSET of x1. The step distance between each stripe is x1dist. Thus, 712*b* has a total X OFFSET of x1+x1dist, 712*c* has a total x OFFSET of x1+(2*x1 dist), and 712*d* has a total x OFFSET of x1+(3*x1 dist).

The instantiations of pattern_A and pattern_Z overlap at least in part with the except area 701. In the event of such an interaction, the portion of any shapes generated by pattern_A and pattern_Z that overlap with the except area 701 will be omitted. Thus, 711*g* and 711*h* are entirely encompassed within the except area 701 and are therefore either removed after generation or not created in the first place. Shapes 712*a-b* also overlap with the except area 701 but do so only partially. Thus, the portions of 712*a* and 712*b* that overlap will not be created or will be removed. Functionally speaking, a shape that is wholly encompassed by an exception area can simply be removed, whereas a shape that is only partially encompassed by an exception area will have to be trimmed, split, or both. For instance, as illustrated here, 712a and 712b can each be split into two sections. A first that runs from the low edge of the region 700 to the low edge of the exception area 701 (e.g., ymin to y'$_{L1}$). A second that runs from the high edge of the exception area 701 to the high edge of the region 700 (e.g., y'$_{H1}$ to ymax).

Bringing it all together, the collection of elements that define region 700 might be represented as follows:

```
{EXCEPTAREA ex1
    {AREA {x'L1 y'L1 x'H1}}
{REGION
    {AREA {xL1 yL1 xH1 yH1}}
    {LAYER M3
        {METAL "MxStaple" pattern_Z
            {NET vdd}
            {OFFSET x0 y0}
            {STEPDISTANCE x0dist y0dist}
        }
        {METAL "MxStripe" pattern_A
            {NET vdd}
            {OFFSET x1*}
            {STEPDISTANCE x1dist*}
        }
    }
}
```

FIGS. 8A-8D illustrate example follow arrangements between patterns having different orientation according to some embodiments. Generally, follow arrangements can be used between different patterns regardless of the layer that those patterns are on. This allows for easy alignment between patterns even across layers. Because of this, we discuss the FOLLOW examples without reference to any particular layers. Instead, the discussion will focus on two different patterns (pattern "A" at 800A and pattern "B" at 800B) that are oriented perpendicular with each other.

FOLLOW syntax may comprise the following:
{FOLLOW (xRefPatternId|{reference phrase}|*) (yRefPatternId|{reference phrase}|*)}

In the FOLLOW syntax, "reference phrase" is defined to be refPatternId RANGE startNum endNum [SIZE setSize], whereby default startNum/endNum are defined to include all shapes in the followed reference pattern. Furthermore, the FOLLOW statement is normally paired with an ALIGNMENT statement.

ALIGNMENT syntax may comprise the following:
{ALIGNMENT (xAlignment|{alignment phrase}|*) (yAlignment|{alignment phrase}|*)}

In the ALIGNMENT syntax, the x/yAlignment is of one of the following alignment types LOWEDGE, the CENTER, or the HIGHEDGE. The "alignment phrase" is defined to be x/yAlignment RANGE startNum endNum, whereby default startNum/endNum are defined to include all shapes in the current pattern.

Figure 8A:
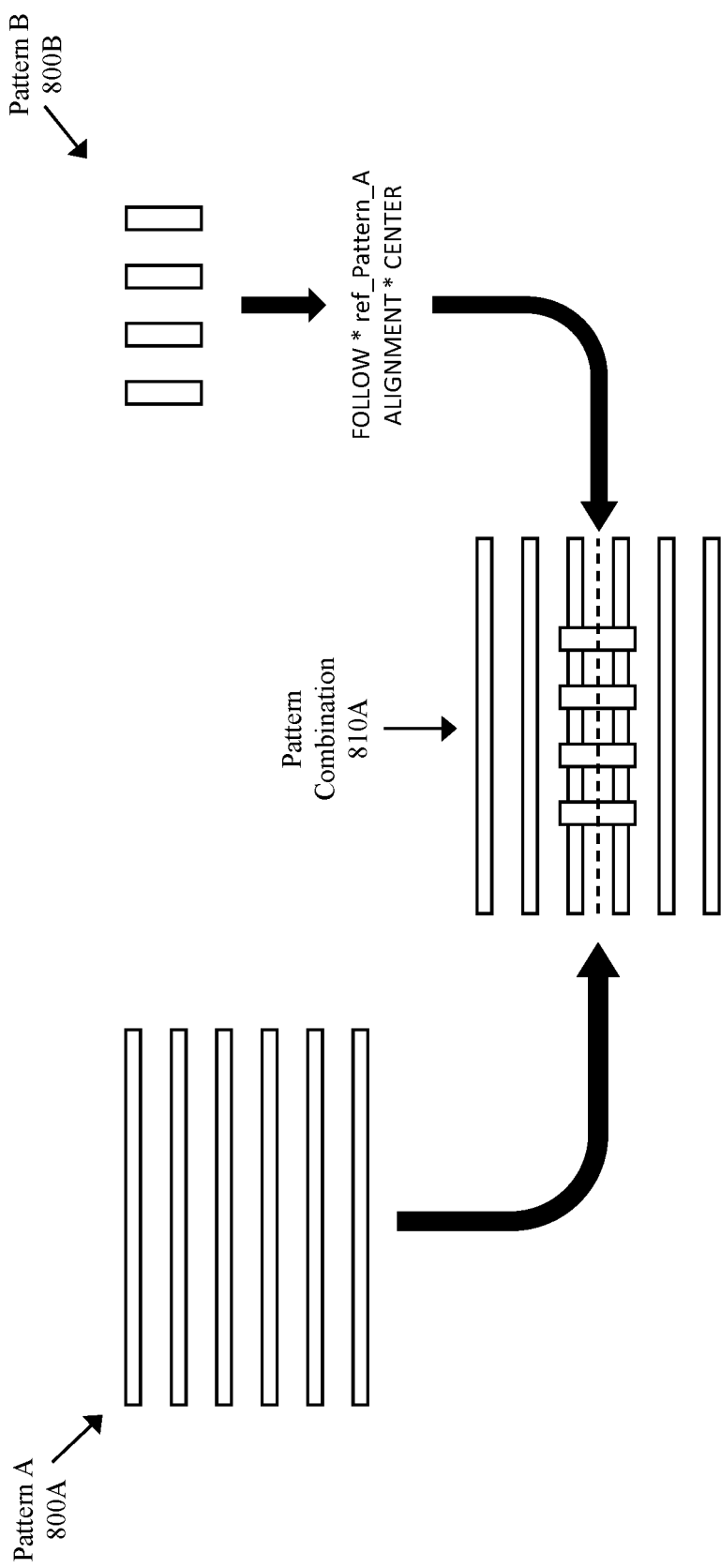

FIG. 8A illustrates a simple centered follow arrangement between two patterns.

The FOLLOW statement ("FOLLOW*ref_Pattern_A ALIGNMENT*CENTER") specifies that Pattern B (800B) should follow pattern A (800A) with a centered alignment. Thus, the Pattern B is placed such that it is centered within the placement location of pattern A (see pattern combination 810A).

Figure 8B:
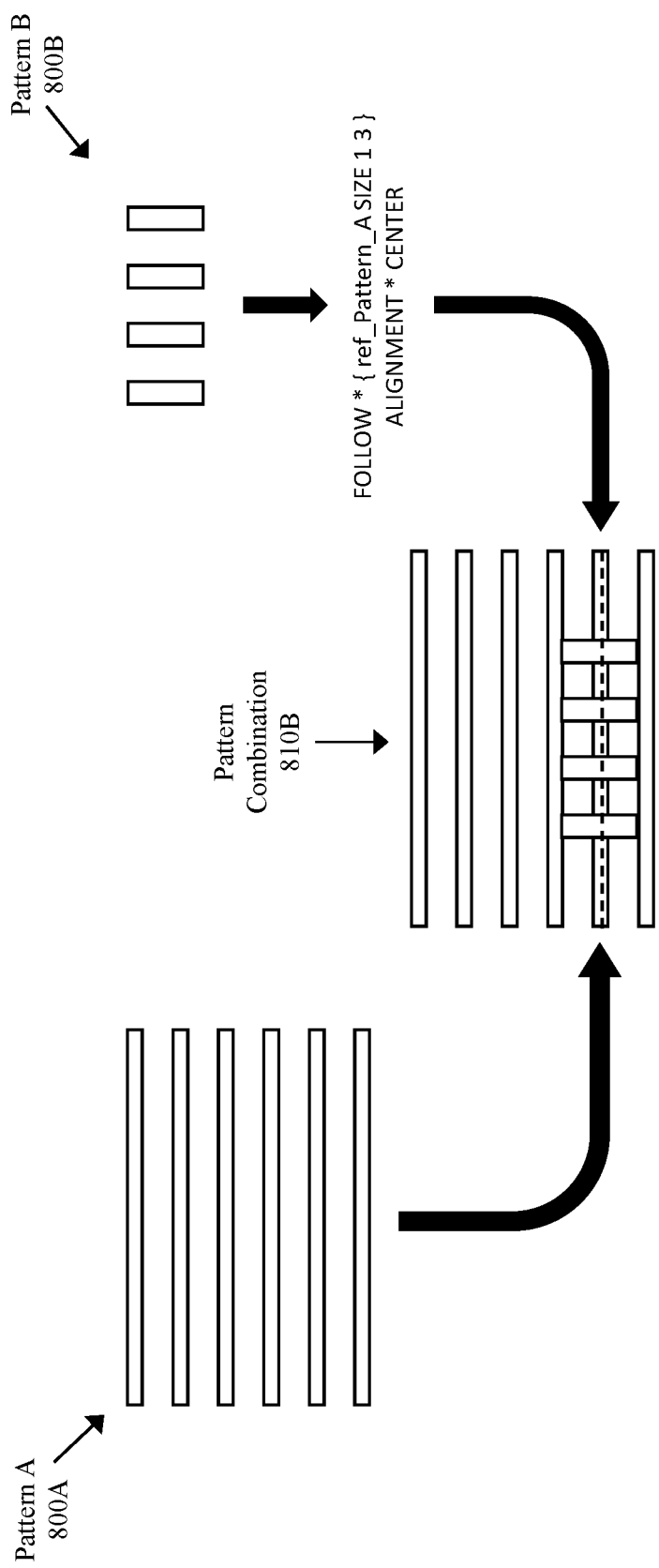

FIG. 8B illustrates a modified centered follow arrangement between two patterns where the second pattern is centered on only a portion of the first pattern.

The FOLLOW statement ("FOLLOW*{ref_Pattern_A SIZE 1 3} ALIGNMENT*CENTER") specifies that Pattern B (800B) should follow pattern A (800A) with a centered alignment on shapes 1-3 of pattern A. Thus, the Pattern B is placed such that it is centered within the placement location of Shapes 1-3 of pattern A (see pattern combination 810B).

FIG. 8C illustrates a modified centered follow arrangement between two patterns where multiple instances of the second pattern are centered on two different portions of the first pattern.

The FOLLOW statement ("FOLLOW*{ref_Pattern_A Range 1 2 SIZE 3}ALIGNMENT*CENTER") specifies that Pattern B (800B) should follow pattern A (800A) with a centered alignment on shapes 1-2 of pattern A and with the pattern repeated for every 3 shapes of the followed pattern (pattern A). Thus, the instances of Pattern B are placed such that they are centered within the placement location of shapes 1-2 and shapes 4-5 of pattern A (see pattern combination 810C).

Figure 8D:
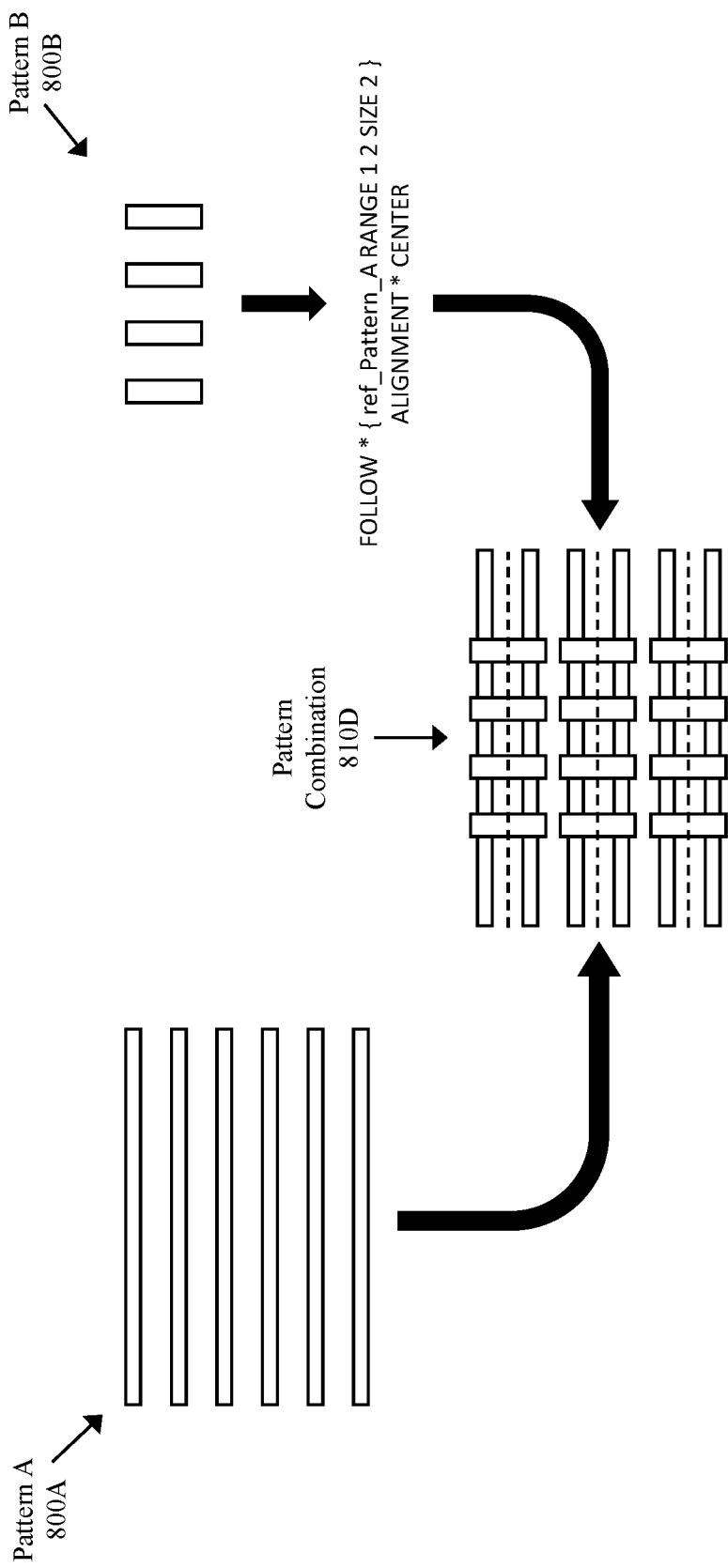

FIG. 8D illustrates a modified centered follow arrangement between two patterns where multiple instances of the second pattern are centered on different portions of the first pattern.

The FOLLOW statement ("FOLLOW*{ref_Pattern_A Range 1 2 SIZE 2}ALIGNMENT*CENTER") specifies that Pattern B (800B) should follow pattern A (800A) with a centered alignment on shapes 1-2 of pattern A and with the pattern repeated for every 2 shapes of the followed pattern (pattern A). Thus, instances of Pattern B are placed such that they are centered within the placement location of shapes 1-2, 3-4, and 5-6 of pattern A (see pattern combination 810D).

FIGS. 9A-9D illustrate example follow arrangements between patterns having the same orientation according to some embodiments. FIGS. 9A-9D present a variation of the circumstances of the FIGS. 8A-8D examples. Thus, the discussion of FIGS. 8A-8D largely applies here. However, here pattern A (900A) is different from pattern A (800A) and pattern B (900B) is different from pattern B (800B). Additionally, pattern A (900A) and Pattern B (900B) have the same orientation, and thus are parallel to each other as apposed the perpendicular relationship between 800A and 800B.

Figure 9A:
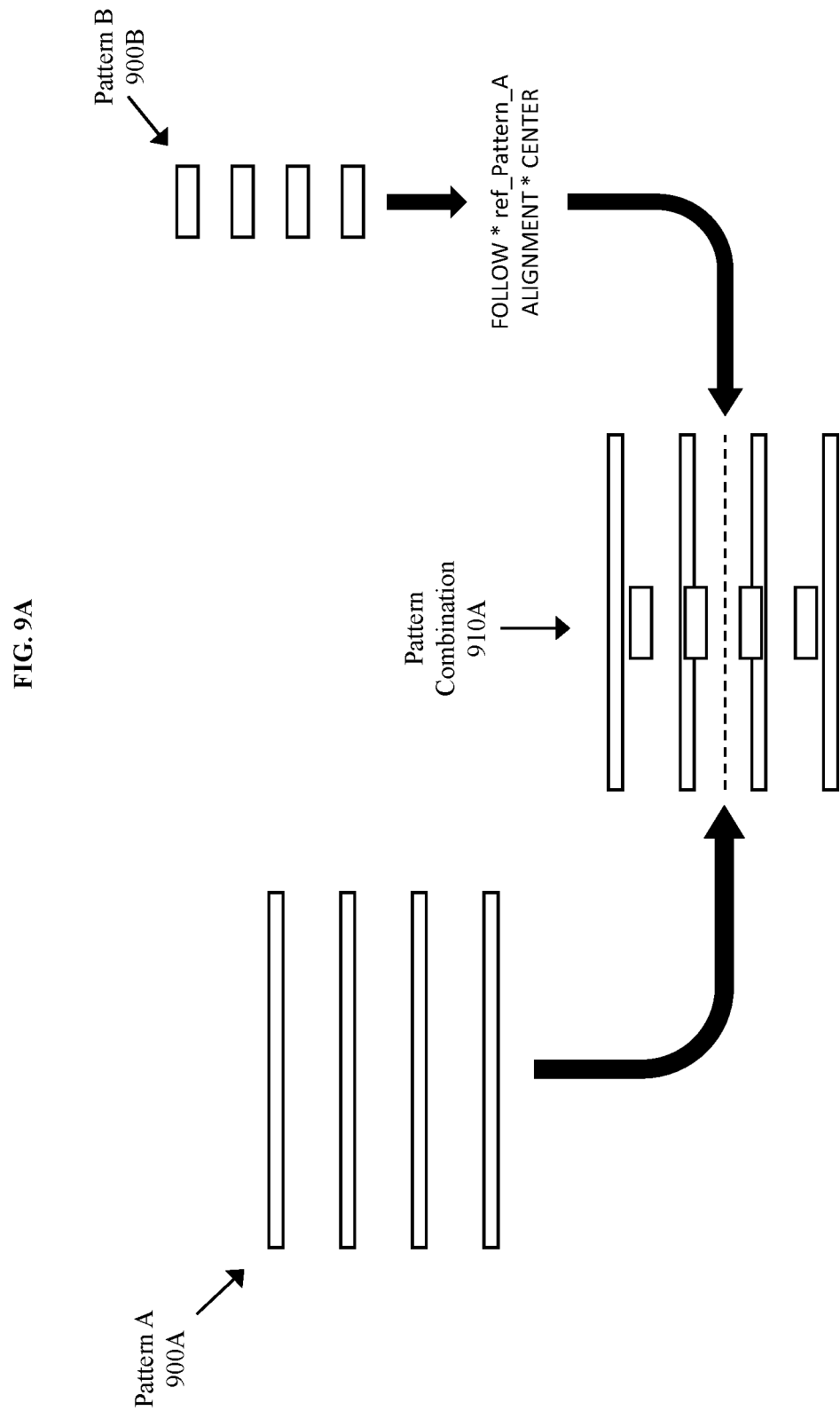
FIGS. 9A-9D illustrate example follow arrangements between patterns having the same orientation according to some embodiments.

FIG. 9A illustrates a simple centered follow arrangement between the two patterns.

The FOLLOW statement ("FOLLOW*ref_Pattern_A ALIGNMENT*CENTER") specifies that Pattern B (900B) should follow pattern A (900A) with a centered alignment. Thus, the Pattern B is placed such that it is centered within the placement location of pattern A (see pattern combination 910A).

Figure 9B:
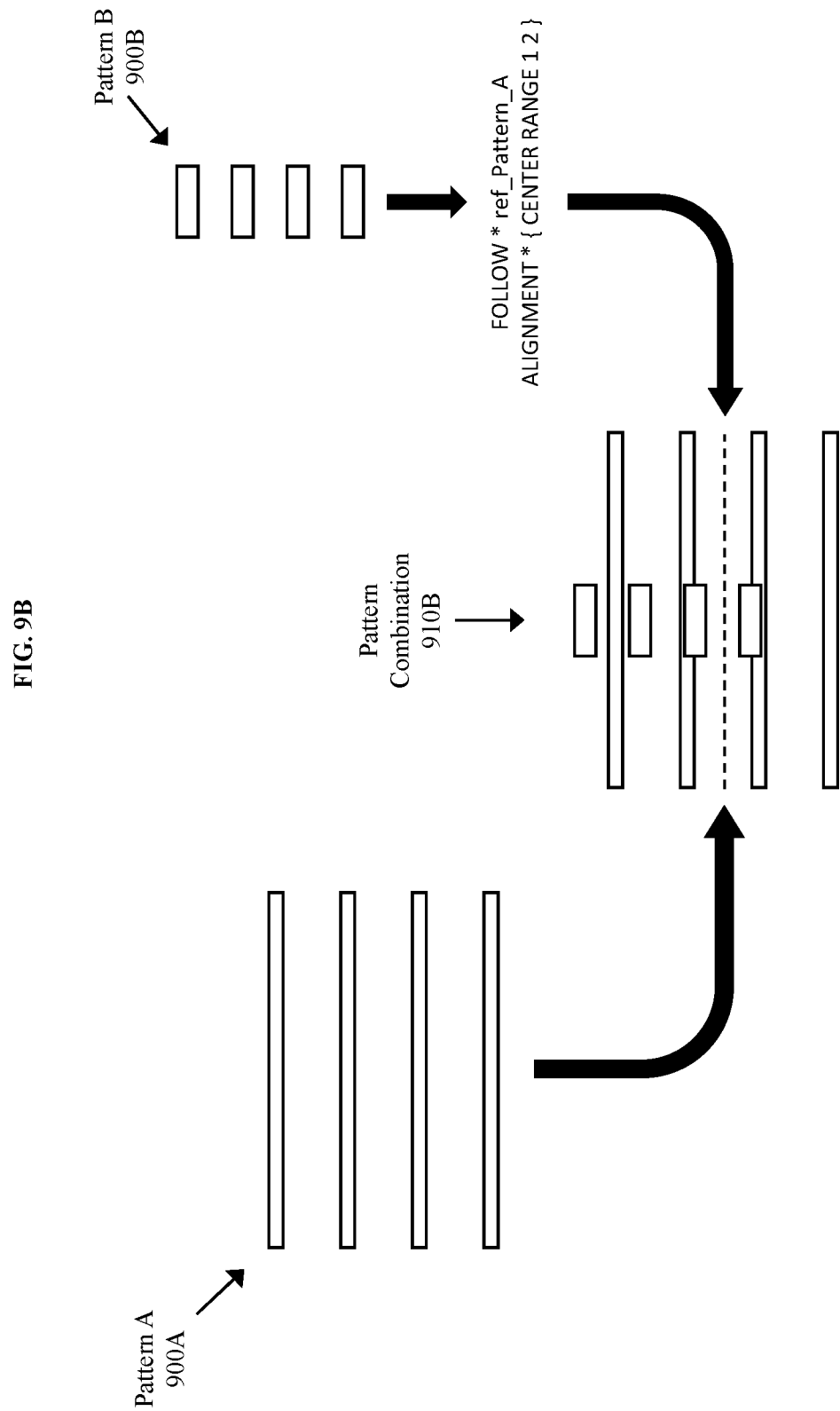

FIG. 9B illustrates a modified centered follow arrangement between two patterns where the second pattern is centered with respect to only a portion of the second pattern.

The FOLLOW statement ("FOLLOW*{ref_Pattern A}ALIGNMENT*{CENTER RANGE 1 2}") specifies that Pattern B (900B) should follow pattern A (800A) with a centered alignment on shapes 1-2 of the pattern B (900B). Thus, the Pattern B is placed such that it is centered within the placement location of Shapes 1-2 of pattern B and all shapes of pattern A (see pattern combination 910B).

Figure 9C:
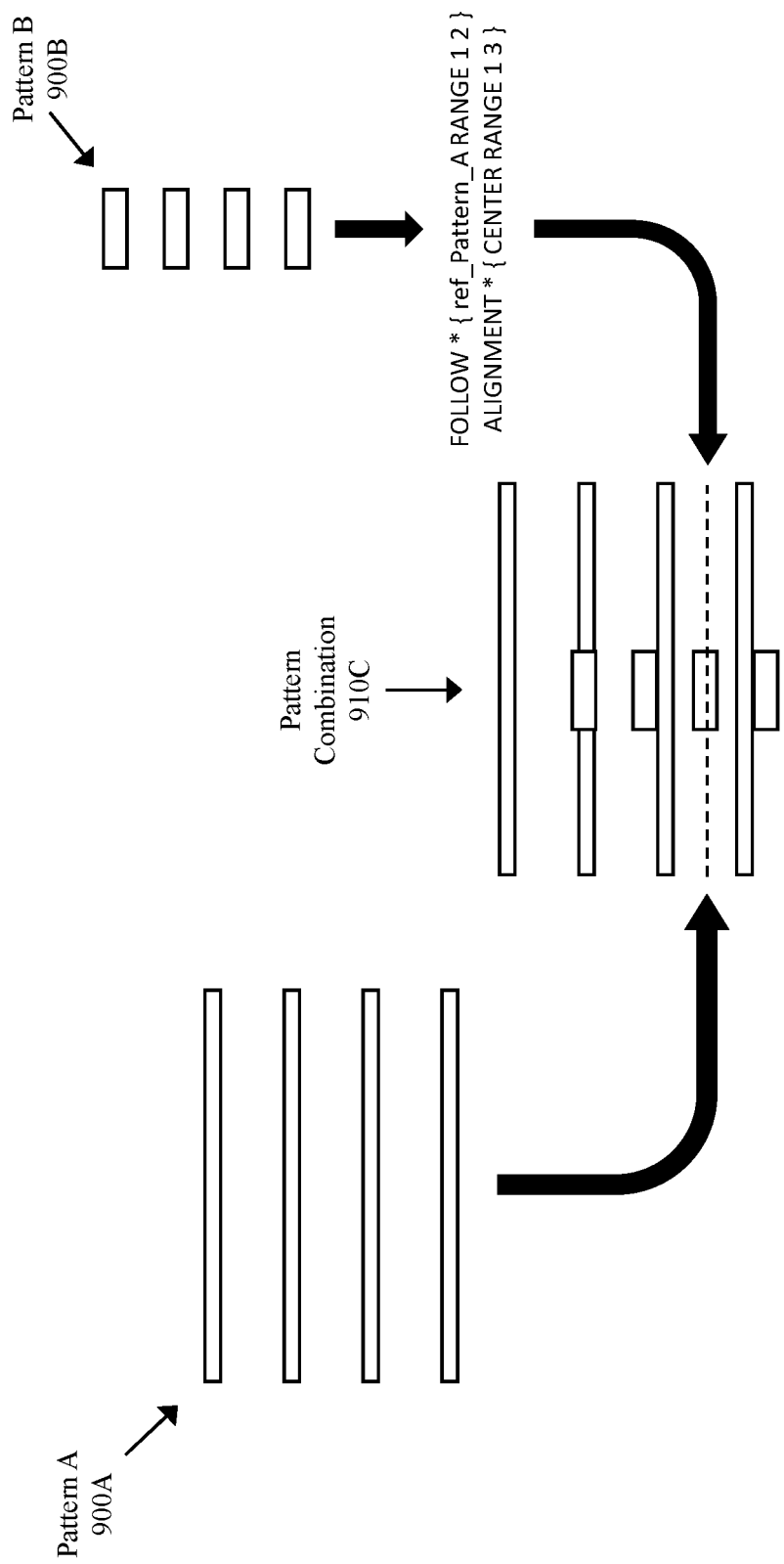

FIG. 9C illustrates a modified centered follow arrangement between two patterns where an instance of the second pattern is centered on only a portion of the first pattern and only a portion of the second pattern.

The FOLLOW statement ("FOLLOW*{ref_Pattern_A Range 1 2}ALIGNMENT*{CENTER RANGE 1 3}")

specifies that Pattern B (800B) should follow pattern A (800A) with a centered alignment on shapes 1-2 with respect to pattern A and shapes 1-3 with respect to pattern B. Thus, the Pattern B is placed such that it is centered within the placement location of shapes 1-2 of pattern A and 1-3 of pattern B (see pattern combination 910C).

Figure 9D:
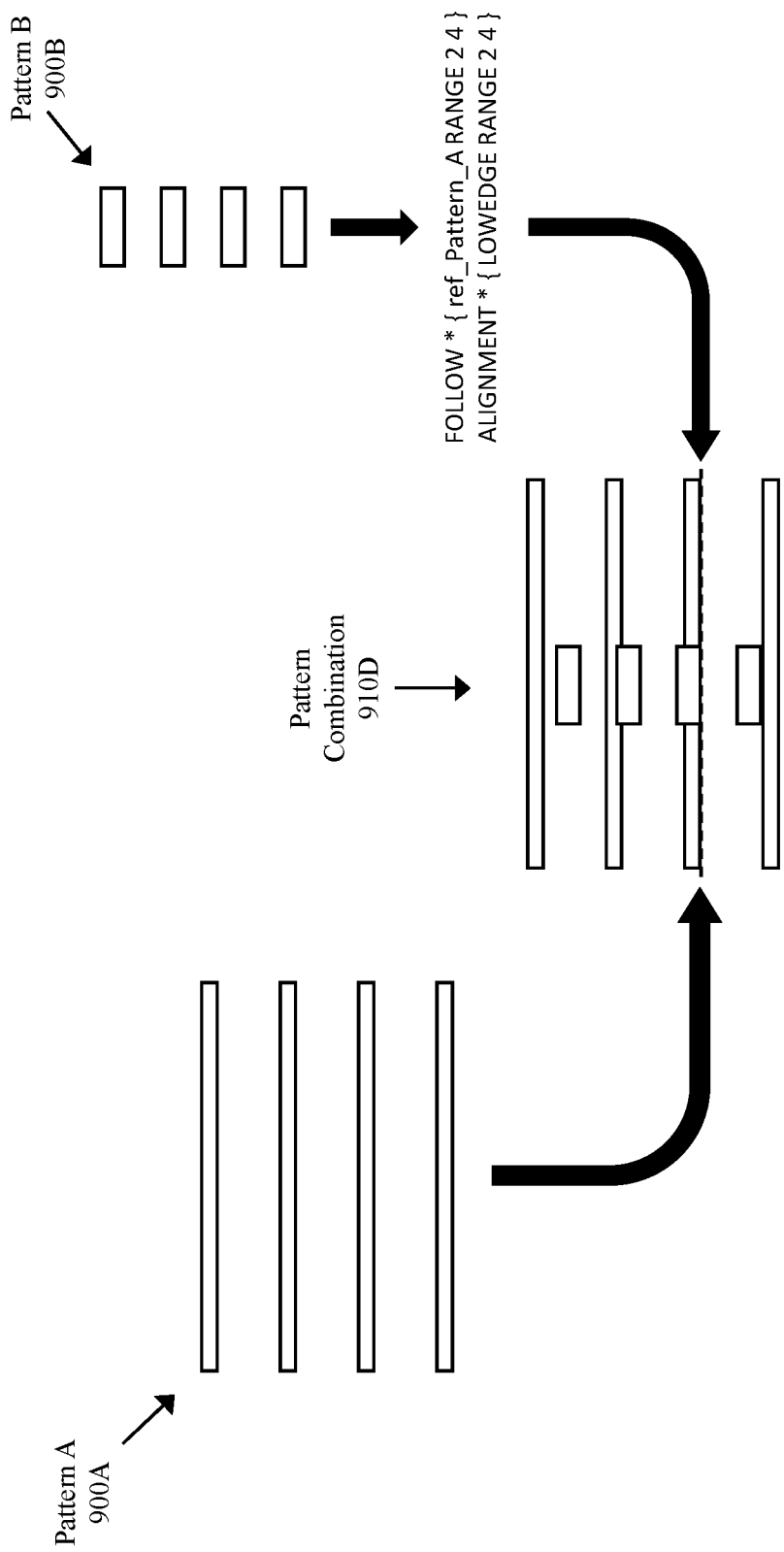

FIG. 9D illustrates a modified LOWEDGE follow arrangement between two patterns where an instance of the second pattern is aligned to the lower edge of the indicated shapes for each pattern.

The FOLLOW statement ("FOLLOW*{ref_Pattern_A Range 2 4}ALIGNMENT*{LOWEDGE RANGE 2 4}") specifies that Pattern B (900B) should follow pattern A (900A) with the lower edges of the second through fourth shapes in each pattern being aligned (see pattern combination 910D). As a result, the lower edge of shape 2 in each pattern is aligned.

FIG. 10 illustrates an example embodiment where shapes are snapped to tracks according to some embodiments. In particular, the figure illustrates shapes on three different metal layers, where those shapes are snapped to tracks for the corresponding layer.

Metal layer 1 shapes are represented by vertically aligned rectangles have a black border and a white fill. The metal layer 1 shapes all fall on the tracks for metal layer 1 and are therefore already specified in such a way as to fall on the tracks properly without snapping. Metal layer 1 tracks are identified at 1001.

Metal layer 2 shapes are represented by horizontally aligned rectangles have a solid/broken black border. When the border is broken the shape is representing a position that the shape would have been in before being snapped to a corresponding track. Metal layer 2 tracks are identified at 1002.

Metal layer 3 shapes are represented by vertically aligned rectangles have a solid/broken black border and a diagonal hash fill. When the border is broken the shape is representing a position that the shape would have been in before being snapped to a corresponding track and possibly aligned with a corresponding metal 2 shape. Metal layer 3 tracks are identified at 1003.

As illustrated, the metal layer 1-3 shapes are represented as different groups (1010*a-l*). As can be seen in the FIG. 10, groups 1010*b* and 1010*l* are specified such that they already fall on the tracks. However, groups 1010*a* and 1010*c-k* include shapes that do not all fall on the appropriate track (see broken border shapes) and are therefore not properly aligned.

Groups 1010*a*, 1010*c*, 1010*f*, 1010*h*, 1010*j*, and 1010*k* as illustrated as include only one shape that is not already aligned to a track. For groups 1010*a*, 1010*c*, 1010*j*, and 1010*k* the metal layer 3 shape is snapped to the nearest metal layer 3 track. Groups 1010*f* and 1010*h* include a metal layer 2 shape that is snapped to the nearest track, but also includes a centering alignment of the metal layer 3 object in the group to the metal layer 2 object.

Groups 1010*d*, 1010*e*, 1010*g*, and 1010*i* as illustrated include two shapes that are not already aligned to a track. In each of groups 1010*d*, 1010*e*, 1010*g*, and 1010*i* both the metal layer 2 and the metal layer 3 shapes are snapped to a nearest track, but metal layer 3 is also centered on the corresponding metal layer 2 object.

In some embodiments, snapping the metal layer 2 objects to a track causes a corresponding metal layer 3 track to be center on the metal layer 2 object. In some embodiments, the metal layer 2 object is snapped to a track before the metal layer 3 object and thus, the metal layer 3 object is centered on a corresponding metal layer 2 object only once.

Figure 11A:
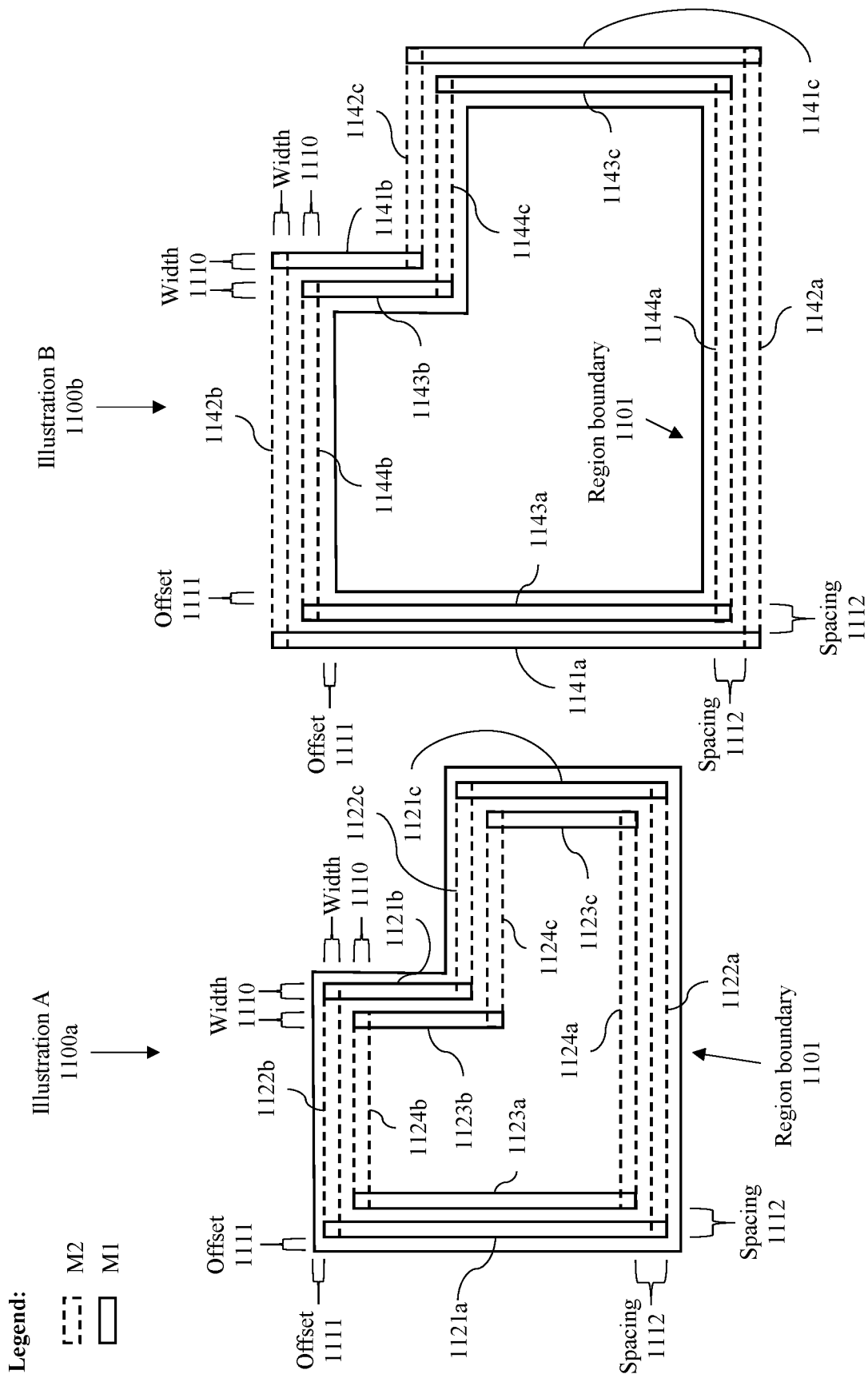
FIGS. 11A-11B illustrate example ring arrangements according to some embodiments.
Figure 11B:
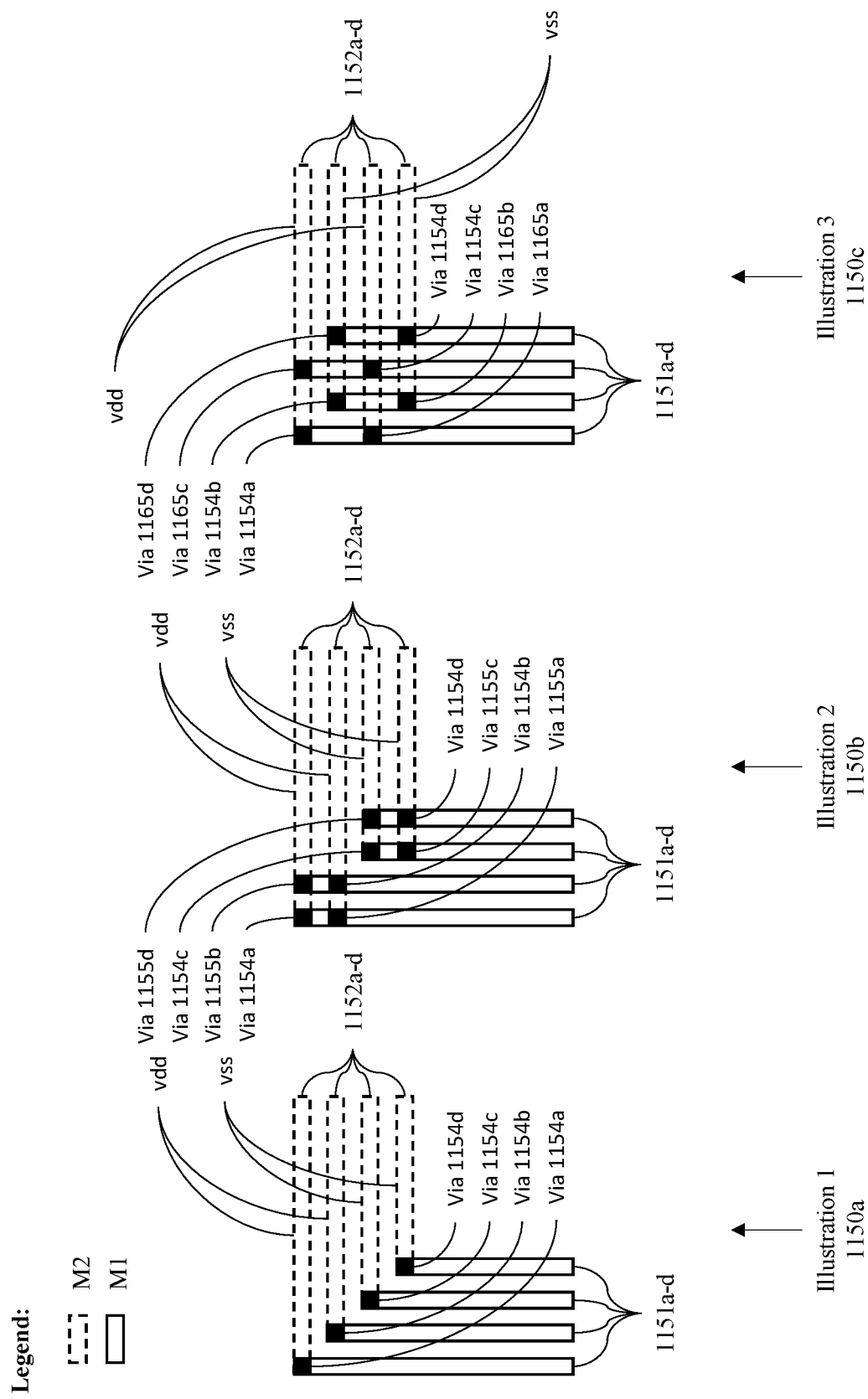

FIGS. 11A-11B illustrate example ring arrangements according to some embodiments. Generally, rings are created for each region and provide for the connection of stripes to power and/or ground.

FIG. 11A illustrates two different ring arrangements according to some embodiments. Illustration A shows a ring structure arranged within the boundary of a region, and Illustration B shows a ring structure arranged outside of the boundary of a region.

Illustration A (see 1100*a*) might be generated in response to the following: {RING {INNER}{LAYER M2 M2 M1 M1}{NET VDD VSS}{WIDTH w}{OFFSET o}{SPACING s}}. The first part of the statement indicates that the ring structure should be generated within the ring boundary (see 1101 and "INNER"), the second part of the statement specifies which layer shapes are to be generated for corresponding nets on ("LAYER") where VDD and VSS are to be generated on each of those layers (see "NET"). The width w (see 1110), offset o (see 1111), and spacing (see 1112) is then specified. As can be seen in illustration A, multiple rectangular shapes are generated on respective layers to form the ring structure. For example, VDD is provided by rectangular shapes 1121*a-c* on the metal 1 layer and rectangular shapes 1122*a-c* on the metal 2 layer. Similarly, VSS is provided by rectangular shapes 1123*a-c* on the metal 1 layer and rectangular shapes 1124*a-c* on the metal 2 layer. Additionally, not illustrated here, the corners of the metal 1 layer objects and the metal 2 layer objects for the same net would be connected using one or more vias. Finally, the offset o (1111) is applied to the first inner ring for the VDD net, and the offset o plus the spacing s (1112) is applied to the next ring. If additional rings are to be generated a corresponding multiple of spacing s (e.g., 1112) plus the offset o would be utilized. Additionally, the width of each rectangle would be specified by w (see 1110).

Illustration B (see 1100*b*) might be generated in response to the following: {RING {OUTER}{LAYER M2 M2 M1 M1}{NET VDD VSS}{WIDTH w}{OFFSET o}{SPACING s}}. Here the only difference in the statement is that the statement indicates that the ring structure should be generated outside of the ring boundary (see 1101 and "OUTER"). As a result, the offset o and spacing s is applied in the outward direction. Thus, VDD is provided by rectangular shapes 1141*a-c* on the metal 1 layer and rectangular shapes 1142*a-c* on the metal 2 layer which are outside of the region boundary. Similarly, VSS is provided by rectangular shapes 1143*a-c* on the metal 1 layer and rectangular shapes 1144*a-c* on the metal 2 layer which are also outside of the region boundary.

FIG. 11B illustrates example via arrangements for rings having four net elements according to some embodiments. Generally, rings are created for each region and provide for the connection of stripes to power and/or ground. This provided illustrations show example via coupling patterns for multi-level ring structures.

Each illustration (see 1150*a-c*) shows a ring structure having four levels and two sources (vdd and vss) where two of the four levels are connected to vdd and two other levels of the four levels are connected to vss. As shown each level comprises at least a rectangular shape on metal layer 1 (e.g., 1151*a*) and a corresponding rectangular shape on metal layer 2 (e.g., 1152*a*). Metal layer 1 shapes are horizontally aligned and identified by 1151*a-d* and metal layer 2 shapes are vertically aligned and identified by 1152*a-d*.

Illustration 1 (see 1150*a*) shows a 1-to-1 connection pattern with each pair of corresponding shapes being connected where they overlap at a corner and is generate in response to at least {RING . . . {NET vdd vdd vss vss}}. Thus, 1151*a* is connected to 1152*a* using a via 1154*a*, 1151*b* is connected to 1152*b* using a via 1154*b*, 1151*c* is connected to 1152*c* using a via 1154*c*, and 1151*d* is connected to 1152*d* using a via 1154*d*. However, in this arrangement, circuits with the same net are not locally connected to each other across levels. For example, 1152*c*-*d* are both identified as net vss but are not locally connected.

Illustration 2 (see 1150*b*) shows a multi-connection pattern where each corresponding shape is connected to each other using one or more vias when those shapes are connected to the same net and is generated in response to at least {RING . . . {NET USEGROUP vdd vdd vss vss}}. As with illustration 1, 1151a is connected to 1152*a* using a via 1154*a*, 1151*b* is connected to 1152*b* using a via 1154*b*, 1151*c* is connected to 1152*c* using a via 1154*c*, and 1151*d* is connected to 1152*d* using a via 1154*d*. However, illustration 2 adds the following connections 1151*a* to 1152*b* using a via 1155*a*, 1151*b* to 1152*a* using a via 1155*b*, 1151*c* to 1152*d* using a via 1155*c*, and 1151*d* to 1152*c* using a via 1155*d*. In this way, the different levels of the multi-level ring structure that are associated with the same net are locally connected using at least vias.

Illustration 3 (see 1150*c*) shows a multi-connection pattern where each corresponding shape is connected to each other using one or more vias when those shapes are connected to the same net and is generate in response to at least {RING . . . {USEGROUP vdd vss vdd vss}}. As with illustration 1, 1151a is connected to 1152*a* using a via 1154*a*, 1151*b* is connected to 1152*b* using a via 1154*b*, 1151*c* is connected to 1152*c* using a via 1154*c*, and 1151*d* is connected to 1152*d* using a via 1154*d*. However, illustration 3 adds the following connections 1151*a* to 1152*c* using a via 1165*a*, 1151*b* to 1152*d* using a via 1165*b*, 1151*c* to 1152*a* using a via 1165*c*, and 1151*d* to 1152*b* using a via 1165*d*. In this way, the different levels of the multi-level ring structure that are associated with the same net are locally connected.

Finally, outside of the context of a ring structure, VIA statements define VIARULE preferences or the CUTCLASS preferences to be used for generating up vias, which connects a lower routing layer with a layer above that routing layer. The VIARULE statement is mutually exclusive with the CUTCLASS statement, but if both statements are missing, then the auto routing tool will choose the first DRC clean predefined rule or generated rule that can provide the maximum cut area. VIARULE defines the preferred VIARULE to be used for generating vias. The value can be PREDEFINED, where all predefined VIARULEs have higher priority than a GENERATED via rule, which has a higher priority than a default via rules. The first predefined rule that has no DRC will be chosen if one exists, otherwise a generated rule will be used to generate a via with the maximum cut area. If only a generated via rule with clean DRC can be found, then the rule that can bring maximum cut area will be used. If there is no corresponding DRC generated rule that exists, then the connection will be left open. CUTCLASS defines the preferred CUTCLASS to be used for generating vias. The value can be one of the following: {[SQUARE|BAR|LARGE] . . . } which defines the cut shape selection order when selecting the predefined via rules. By default, the cut shape order will be square cuts follows by bar cuts, and lastly large cuts. A list of cut class names define the via rule selection priority based on the given cut class names.

```
{VIA
    {VIARULE     [PREDEFINED|GENERATED|{x1
        x2 . . . xn}]}
    {CUTCLASS [{[SQUARE|BAR|LARGE] . . . }|{x1
        x2 . . . xn}]}
}
```

System Architecture Overview

Figure 12:
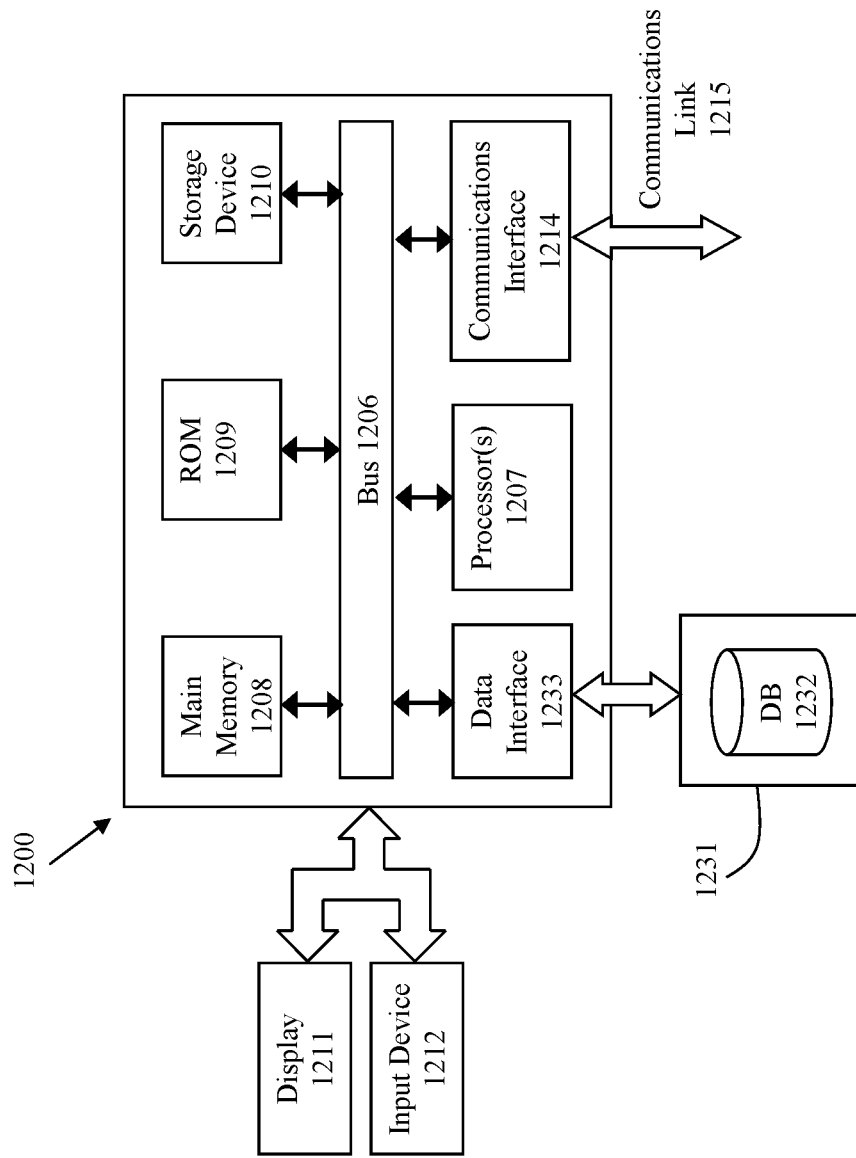
FIG. 12 shows an architecture of an example computing system with which the invention or parts of the invention may be implemented.

FIG. 12 shows an architecture of an example computing system with which the invention may be implemented. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to one embodiment of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1215 (e.g., LAN, PTSN, or wireless network) may perform the sequence of instructions required to practice the invention in coordination with one another.

Computer system 1200 may transmit and receive messages, data, and instructions, including program, e.g., application code, through communication link 1215 and communication interface 1214. Received program code may be executed by processor 1207 as it is received, and/or stored in disk drive 1210, or other non-volatile storage for later execution. Computer system 1200 may communicate through a data interface 1233 to a database 1232 on an external storage device 1231.

Therefore, what has been described herein an improvement to EDA tools used to design semiconductor devices that improves performance by providing an automated approach to power and ground generation that reflects the intent of a user. Additionally, the approach disclosed herein allows: a user to describe desired routing patterns for each layer and how the pattern will be laid out in the design with respect to other patterns from a different layer; enables a new flow that allows for early optimization of power and ground structures; gives the complete picture of the entire power and ground structure; provides flexibility in alignment methods; avoids the extensive trial-and-error steps needed in order to calculate offsets and distances to maintain pattern alignment using previous approaches; and increases design portability.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
identifying an integrated circuit design schematic;
identifying a power and ground structure description having a plurality of user defined regions,
wherein the power and ground structure description is provided in a power and ground structure description language (PSDL), the PSDL comprising a syntax for describing patterns for respective layers in corresponding regions of the plurality of user defined regions, and patterns are represented by one or more pattern statements;
performing power and ground synthesis based on at least the power and ground structure description having the plurality of user defined regions at least by parsing the power and ground description in the PSDL to generate the patterns in the respective layers and corresponding regions; and
performing design rule checking after synthesis of a power and ground structure and placement, clock tree synthesis, and routing.

2. The method of claim 1, wherein performing power and ground synthesis based on at least the power and ground structure description having the plurality of user defined regions comprises performing a fast power and ground routing operation.

3. The method of claim 2, wherein the power and ground structure comprises a power and ground mesh having stripes and vias generated by fast power and ground routing operation using at least a global grid spanning the plurality of user defined regions.

4. The method of claim 3, wherein power analysis is performed based on at least the power and ground structure before placement, clock tree synthesis, and routing.

5. The method of claim 3, wherein performing the fast power and ground routing operation comprises generating a power and ground structure and performing limited design rule checking for the stripes and vias generated by the fast power and ground routing operation.

6. The method of claim 2, wherein performing power and ground synthesis based on at least the power and ground structure description having the plurality of user defined regions further comprises complete power and ground synthesis, the complete power and ground synthesis comprising at least design rule checking (DRC) and correcting one or more DRC errors.

7. The method of claim 1, wherein at least a first instance of a first pattern template is instantiated on first layer and a second instance of the first pattern template is instantiated on a second template.

8. The method of claim 1, wherein user defined regions have areas different from any one or more macro blocks overlapped by a respective user defined region of the plurality of user defined regions.

9. A non-transitory computer readable medium having stored thereon a sequence of instructions which, when executed by a processor performs a set of acts, the set of acts comprising:
identifying an integrated circuit design schematic;
identifying a power and ground structure description having a plurality of user defined regions, wherein the power and ground structure description is provided in a power and ground structure description language (PSDL), the PSDL comprising a syntax for describing patterns for respective layers in corresponding regions of the plurality of user defined regions, and patterns are represented by one or more pattern statements;
performing power and ground synthesis based on at least the power and ground structure description having the plurality of user defined regions at least by parsing the power and ground description in the PSDL to generate the patterns in the respective layers and corresponding regions; and
performing design rule checking after synthesis of a power and ground structure and placement, clock tree synthesis, and routing.

10. The computer readable medium of claim 9, wherein performing power and ground synthesis based on at least the power and ground structure description having the plurality of user defined regions comprises performing a fast power and ground routing operation.

11. The computer readable medium of claim 10, wherein the power and ground structure comprises a power and ground mesh having stripes and vias generated by fast power and ground routing operation using at least a global grid spanning the plurality of user defined regions.

12. The computer readable medium of claim 11, wherein power analysis is performed based on at least the power and ground structure before placement, clock tree synthesis, and routing.

13. The computer readable medium of claim 11, wherein performing the fast power and ground routing operation comprises generating a power and ground structure and performing limited design rule checking for the stripes and vias generated by the fast power and ground routing operation.

14. The computer readable medium of claim 11, wherein performing power and ground synthesis based on at least the power and ground structure description having the plurality of user defined regions further comprises complete power and ground synthesis, the complete power and ground synthesis comprising at least design rule checking (DRC) and correcting one or more DRC errors.

15. The computer readable medium of claim 9, wherein at least a first instance of a first pattern template is instantiated on first layer and a second instance of the first pattern template is instantiated on a second template.

16. The computer readable medium of claim 9, wherein user defined regions have areas different from any one or more macro blocks overlapped by a respective user defined region of the plurality of user defined regions.

17. A computing system, comprising:
   memory comprising a set of instructions; and
   a processor that executes the set of instructions to perform a set of acts, the set of acts comprising:
      identifying an integrated circuit design schematic;
      identifying a power and ground structure description having a plurality of user defined regions, wherein the power and ground structure description is provided in a power and ground structure description language (PSDL), the PSDL comprising a syntax for describing patterns for respective layers in corresponding regions of the plurality of user defined regions, and patterns are represented by one or more pattern statements;
      performing power and ground synthesis based on at least the power and ground structure description having the plurality of user defined regions at least by parsing the power and ground description in the PSDL to generate the patterns in the respective layers and corresponding regions; and
      performing design rule checking after synthesis of a power and ground structure and placement, clock tree synthesis, and routing.

18. The computing system of claim 17, wherein performing power and ground synthesis based on at least the power and ground structure description having the plurality of user defined regions comprises performing a fast power and ground routing operation.

19. The computing system of claim 18, wherein the power and ground structure comprises a power and ground mesh having stripes and vias generated by fast power and ground routing operation using at least a global grid spanning the plurality of user defined regions.

20. The computing system of claim 19, wherein performing the fast power and ground routing operation comprises generating a power and ground structure and performing limited design rule checking for the stripes and vias generated by the fast power and ground routing operation.

* * * * *